(12) United States Patent
Akers et al.

(10) Patent No.: US 12,284,253 B2
(45) Date of Patent: Apr. 22, 2025

(54) PRIVATE SERVICE ENDPOINTS IN ISOLATED VIRTUAL NETWORKS

(71) Applicant: Amazon Technologies, Inc., Seattle, WA (US)

(72) Inventors: Kyle Tailor Akers, Sterling, VA (US); Michael Siaosi Voegele, Bethesda, MD (US); Kevin Christopher Miller, Fairfax, VA (US); Chao Yuan, Arlington, VA (US); David Brian Lennon, Reston, VA (US); Patrick Stephenson, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/413,895

(22) Filed: Jan. 16, 2024

(65) Prior Publication Data

US 2024/0155039 A1 May 9, 2024

Related U.S. Application Data

(63) Continuation of application No. 18/305,265, filed on Apr. 21, 2023, now Pat. No. 12,047,462, which is a
(Continued)

(51) Int. Cl.
*G06F 13/00* (2006.01)
*H04L 9/40* (2022.01)
(Continued)

(52) U.S. Cl.
CPC .......... *H04L 67/51* (2022.05); *H04L 63/0272* (2013.01); *H04L 67/10* (2013.01); *H04L 12/4641* (2013.01)

(58) Field of Classification Search
CPC ..... H04L 67/51; H04L 63/0272; H04L 67/10; H04L 12/4641
(Continued)

(56) References Cited

U.S. PATENT DOCUMENTS 6,240,402 B1 5/2001 Lynch-Aird
6,836,462 B1 12/2004 Albert
(Continued)

FOREIGN PATENT DOCUMENTS

CN 102598591 7/2012
EP 1298853 4/2003

OTHER PUBLICATIONS http://docs.aws.amazon.com/AmazonVPC/latest/UserGuide/vpcendpoints.html, "VPC Endpoints—Amazon Virtual Private Cloud" AWS Documentation, Downloaded Mar. 15, 2015, pp. 1-6.
(Continued)

*Primary Examiner* — Kenneth R Coulter
(74) *Attorney, Agent, or Firm* — Robert C. Kowert; Kowert, Hood, Munyon, Rankin & Goetzel, P.C.

(57) ABSTRACT

A service implemented at a first isolated virtual network of a provider network is added to a database of privately-accessible services. Configuration changes that enable network packets to flow between the first isolated virtual network and a second isolated virtual network without utilizing a network address accessible from the public Internet are implemented. Service requests originating at the second isolated virtual network are transmitted to the first isolated virtual network via private pathways of the provider network. Metrics corresponding to service requests directed from the second isolated network to the service are collected and provided to the respective owners of one or both isolated virtual networks.

20 Claims, 10 Drawing Sheets

Related U.S. Application Data continuation of application No. 17/520,529, filed on Nov. 5, 2021, now Pat. No. 11,637,906, which is a continuation of application No. 16/549,246, filed on Aug. 23, 2019, now Pat. No. 11,172,032, which is a continuation of application No. 16/029,468, filed on Jul. 6, 2018, now Pat. No. 10,397,344, which is a continuation of application No. 14/746,519, filed on Jun. 22, 2015, now Pat. No. 10,021,196.

(51) Int. Cl.
*H04L 67/10* (2022.01)
*H04L 67/51* (2022.01)
*H04L 12/46* (2006.01)

(58) Field of Classification Search
USPC ............... 709/217–219, 201, 245, 238–239, 709/220–222, 227–229; 718/105, 102, 1
See application file for complete search history.

(56) References Cited

U.S. PATENT DOCUMENTS

| | | |
|---|---|---|
| 6,993,021 B1 | 1/2006 | Chuah et al. |
| 7,174,455 B1 | 2/2007 | Arnold et al. |
| 7,325,140 B2 | 1/2008 | Carley |
| 7,383,433 B2 | 6/2008 | Yeager et al. |
| 7,440,415 B2 | 10/2008 | Wild, III et al. |
| 7,505,962 B2 | 3/2009 | Shariff et al. |
| 7,630,368 B2 | 12/2009 | Tripathi et al. |
| 7,631,059 B2 | 12/2009 | Chang et al. |
| 7,634,584 B2 | 12/2009 | Pope et al. |
| 7,733,890 B1 | 6/2010 | Droux et al. |
| 7,792,113 B1 | 9/2010 | Foschiano |
| 7,792,140 B2 | 9/2010 | Droux et al. |
| 7,865,586 B2 | 1/2011 | Cohn |
| 7,912,082 B2 | 3/2011 | Yang et al. |
| 7,937,438 B1 | 5/2011 | Miller et al. |
| 7,945,640 B1 | 5/2011 | VanTine |
| 7,953,865 B1 | 5/2011 | Miller et al. |
| 7,961,726 B2 | 6/2011 | Wang et al. |
| 7,962,950 B2 | 6/2011 | Choo et al. |
| 7,984,066 B1 | 7/2011 | Kilday et al. |
| 7,991,859 B1 | 8/2011 | Miller et al. |
| 8,082,581 B2 | 12/2011 | Wu |
| 8,117,289 B1 | 2/2012 | Miller et al. |
| 8,131,852 B1 | 3/2012 | Miller et al. |
| 8,201,237 B1 | 6/2012 | Doane et al. |
| 8,209,749 B2 | 6/2012 | Babula et al. |
| 8,224,971 B1 | 7/2012 | Miller et al. |
| 8,230,050 B1 | 7/2012 | Brandwine et al. |
| 8,239,538 B2 | 8/2012 | Zhang et al. |
| 8,244,909 B1 | 8/2012 | Hanson et al. |
| 8,259,597 B1 | 9/2012 | Oak |
| 8,261,341 B2 | 9/2012 | Stirbu |
| 8,312,129 B1 | 11/2012 | Miller et al. |
| 8,331,371 B2 | 12/2012 | Judge et al. |
| 8,345,692 B2 | 1/2013 | Smith |
| 8,352,941 B1 | 1/2013 | Protopopov et al. |
| 8,443,435 B1 | 5/2013 | Schroeder |
| 8,478,896 B2 | 7/2013 | Ehlers |
| 8,484,089 B1 | 7/2013 | Lin et al. |
| 8,543,734 B2 | 9/2013 | McDysan |
| 8,559,441 B2 | 10/2013 | Miyabe |
| 8,559,449 B2 | 10/2013 | Rao et al. |
| 8,612,599 B2 | 12/2013 | Tung et al. |
| 8,656,420 B2 | 2/2014 | Foster et al. |
| 8,705,394 B2 | 4/2014 | Venkatachalapathy et al. |
| 8,751,686 B2 | 6/2014 | Filsfils et al. |
| 9,349,134 B1 | 5/2016 | Adams |
| 9,787,499 B2 | 10/2017 | Miller et al. |
| 9,882,968 B1 | 1/2018 | Holgers et al. |
| 9,916,545 B1 | 3/2018 | de Kadt et al. |
| 10,021,196 B1 | 7/2018 | Akers et al. |
| 10,038,866 B2 | 7/2018 | Lee et al. |
| 10,212,161 B1 | 2/2019 | Schaefer et al. |
| 10,218,613 B2 | 2/2019 | Cohn |
| 10,225,146 B2 | 3/2019 | Miller et al. |
| 10,256,993 B2 | 4/2019 | Miller et al. |
| 10,320,644 B1 | 6/2019 | Chen et al. |
| 10,361,911 B2 | 7/2019 | Brandwine et al. |
| 10,367,753 B2 | 7/2019 | Schultze et al. |
| 10,374,949 B2 | 8/2019 | Miller et al. |
| 10,389,608 B2 | 8/2019 | Searle et al. |
| 10,397,344 B2 | 8/2019 | Akers et al. |
| 10,419,287 B2 | 9/2019 | Miller et al. |
| 10,484,297 B1 | 11/2019 | McClenahan |
| 10,498,693 B1 | 12/2019 | Strauss et al. |
| 10,530,657 B2 | 1/2020 | Brandwine et al. |
| 10,574,534 B2 | 2/2020 | Brandwine et al. |
| 10,593,009 B1 | 3/2020 | Surani et al. |
| 10,601,909 B2 | 3/2020 | Brandwine et al. |
| 10,644,933 B2 | 5/2020 | Cohn et al. |
| 10,728,089 B2 | 7/2020 | Brandwine et al. |
| 10,749,808 B1 | 8/2020 | MacCarthaigh |
| 10,749,936 B1 | 8/2020 | Cohn et al. |
| 10,848,346 B2 | 11/2020 | Miller et al. |
| 10,868,715 B2 | 12/2020 | Brandwine et al. |
| 10,917,322 B2 | 2/2021 | Russell |
| 10,951,586 B2 | 3/2021 | Cohn et al. |
| 11,172,032 B2 | 11/2021 | Akers et al. |
| 11,637,906 B2* | 4/2023 | Akers ............... H04L 67/10 709/217 |
| 12,047,462 B2* | 7/2024 | Akers ............... H04L 67/51 |
| 2002/0026592 A1 | 2/2002 | Gavrila et al. |
| 2002/0073215 A1 | 6/2002 | Huitema et al. |
| 2002/0106985 A1 | 8/2002 | Sato et al. |
| 2003/0053441 A1 | 3/2003 | Banerjee |
| 2003/0079043 A1 | 4/2003 | Chang et al. |
| 2003/0084104 A1 | 5/2003 | Salem et al. |
| 2004/0078371 A1 | 4/2004 | Worrall et al. |
| 2005/0198244 A1 | 9/2005 | Eilam et al. |
| 2005/0198384 A1 | 9/2005 | Ansari et al. |
| 2005/0289648 A1 | 12/2005 | Grobman |
| 2006/0013209 A1 | 1/2006 | Somasundaram |
| 2006/0146870 A1 | 7/2006 | Harvey et al. |
| 2006/0251088 A1 | 11/2006 | Thubert et al. |
| 2006/0262736 A1 | 11/2006 | Dong et al. |
| 2008/0002703 A1 | 1/2008 | Tripathi et al. |
| 2008/0059557 A1 | 3/2008 | DeSantis |
| 2008/0080519 A1 | 4/2008 | Park et al. |
| 2008/0104393 A1 | 5/2008 | Glasser et al. |
| 2008/0140846 A1 | 6/2008 | Rehm |
| 2008/0225875 A1 | 9/2008 | Wray et al. |
| 2008/0244579 A1 | 10/2008 | Muller |
| 2008/0267087 A1 | 10/2008 | Beck et al. |
| 2008/0320583 A1 | 12/2008 | Sharma |
| 2009/0083445 A1 | 3/2009 | Ganga |
| 2009/0106405 A1 | 4/2009 | Mazarick |
| 2009/0129385 A1 | 5/2009 | Wray et al. |
| 2009/0190585 A1 | 7/2009 | Allen et al. |
| 2009/0199177 A1 | 8/2009 | Edwards |
| 2009/0205018 A1 | 8/2009 | Ferraiolo et al. |
| 2009/0249472 A1 | 10/2009 | Litvin |
| 2009/0288084 A1 | 11/2009 | Astete et al. |
| 2010/0049637 A1 | 2/2010 | Laventman et al. |
| 2010/0057831 A1 | 3/2010 | Williamson |
| 2010/0085984 A1 | 4/2010 | Shin et al. |
| 2010/0131949 A1 | 5/2010 | Ferris |
| 2010/0132012 A1 | 5/2010 | Van Riel et al. |
| 2010/0214949 A1 | 8/2010 | Smith et al. |
| 2010/0246443 A1 | 9/2010 | Cohn et al. |
| 2010/0257276 A1 | 10/2010 | Savolainen |
| 2011/0022694 A1 | 1/2011 | Dalal et al. |
| 2011/0047540 A1 | 2/2011 | Williams et al. |
| 2011/0072486 A1 | 3/2011 | Hadar et al. |
| 2011/0072487 A1 | 3/2011 | Hadar et al. |
| 2011/0087888 A1 | 4/2011 | Rennie |
| 2011/0099616 A1 | 4/2011 | Mazur et al. |
| 2011/0132016 A1 | 6/2011 | Chandler et al. |
| 2011/0137947 A1 | 6/2011 | Dawson et al. |
| 2011/0145836 A1 | 6/2011 | Wheeler et al. |
| 2011/0251937 A1 | 10/2011 | Falk et al. |

(56) References Cited

U.S. PATENT DOCUMENTS

| | | |
|---|---|---|
| 2011/0251992 A1 | 10/2011 | Bethlehem et al. |
| 2011/0264906 A1 | 10/2011 | Pourzandi et al. |
| 2011/0320605 A1 | 12/2011 | Kramer et al. |
| 2012/0084113 A1 | 4/2012 | Brandwine et al. |
| 2012/0084443 A1 | 4/2012 | Theimer et al. |
| 2013/0031424 A1 | 1/2013 | Srivastava et al. |
| 2013/0227355 A1 | 8/2013 | Dake et al. |
| 2014/0075048 A1 | 3/2014 | Yuksel et al. |
| 2015/0188888 A1 | 7/2015 | Kang et al. |
| 2018/0270201 A1 | 9/2018 | Chanak et al. |
| 2021/0152392 A1 | 5/2021 | Miller et al. |
| 2023/0388390 A1 | 11/2023 | Akers et al. |

OTHER PUBLICATIONS

Wikipedia, "Virtual Private Networks," Aug. 2008, Downloaded Aug. 7, 2013, pp. 1-8.

Costin Raiciu, et al."Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

Amazon Web Services, AWS Direct Connect; User Guide API Version, Oct. 22, 2013, pp. 1-42.

Amazon Web Services, Amazon Virtual Private Cloud; User Guide API Version, Oct. 1, 2013, pp. 1-143.

"A Brief Primer on Anycast", Matthew Prince, Oct. 21, 2011, pp. 1-4.

"Amazon Elastic Compute Cloud", User Guide for Linux, API Version, Jun. 15, 2014, pp. 1-684.

* cited by examiner https://<some-web-site>.com/PrivateServiceMarketplace

Dear <userName>,

Welcome to the IVN-to-IVN service marketplace. Here you will find many types of services which can be accessed securely using private pathways from your IVN, so that you don't need to use public IP addresses. Your service-related traffic will flow entirely within <ProviderNetwork's> internal network, which will help latency and reduce the risk of attacks.

Click on the service names of popular services shown below to learn more. You can also search for services using the filters shown below, or construct your own query using the "custom search" interface.

Popular service categories

Web log analysis services
WLASvc1
WLASvc2

Social media sentiment analysis services
SASvc1

Health management services
HSvc1

...

Show me all available services

Search for privately-accessible services by...

| | |
|---|---|
| Service name | Enter service name, or click here to browse service directory |
| Service provider name | Enter provider name, or click here to browse provider name list |
| Service category | Enter category name, or click here to browse service categories |
| Per-request price | Select price range using drop-down menu |
| Click here to specify a custom search | |

FIG. 7 https://<some-web-site>.com/SwitchToPrivateAccess

Dear <userName>,

Based on our analysis of network traffic, we have found the following list of services that are accessible via private IP addresses, but are currently being accessed from your compute instances using public IP addresses.

If you like, you can switch to using private pathways for these services using the one-click switch-to-private links provided below. If you would like to learn more about the advantages of using private pathways, or the terms and conditions associated with using private addresses to access services within <ProviderNetwork>, click here.

Services you are accessing using public IP addresses

| Name of service being accessed from instances in your IVNs | Your IVN's name | Your instances | Number of service requests in last week | |
|---|---|---|---|---|
| Svc1 (www.<sitename1>.com) | IVN-xyz | Inst0012, Inst0121... | 24152324 | Switch-to-private! |
| Svc3 (www.<sitename3>.com) | IVN-pjk | Inst0065, Inst0343... | 78625 | Switch-to-private! |

[ Show me all privately-accessible services ]

FIG. 8

PRIVATE SERVICE ENDPOINTS IN ISOLATED VIRTUAL NETWORKS

This application is a continuation of U.S. patent application Ser. No. 18/305,265, filed Apr. 21, 2023, now U.S. Pat. No. 12,047,462, which is a continuation of U.S. patent application Ser. No. 17/520,529, filed Nov. 5, 2021, now U.S. Pat. No. 11,637,906, which is a continuation of U.S. patent application Ser. No. 16/549,246, filed Aug. 23, 2019, now U.S. Pat. No. 11,172,032, which is a continuation of U.S. patent application Ser. No. 16/029,468, filed Jul. 6, 2018, now U.S. Pat. No. 10,397,344, which is a continuation of U.S. patent application Ser. No. 14/746,519, filed Jun. 22, 2015, now U.S. Pat. No. 10,021,196, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers.

A few providers allow their customers to create logically isolated networks using resources located at such data centers. For example, a customer may be assigned some set of virtualized servers and/or other resources implemented at hosts managed by the provider, and the customer may be afforded substantial flexibility with respect to the networking configuration of the resources. The customer may, for example, select IP (Internet Protocol) addresses to the servers, define subnets of their choice, and so on. Such customer-configurable networks implemented using provider resources may be referred to by a variety of names, including "isolated virtual networks" or "virtual private clouds". In some scenarios, customers may assign private IP addresses (i.e., addresses that are not visible or advertised outside the isolated virtual networks) to some resources within an isolated virtual network, e.g., without having to be concerned about the uniqueness of the addresses with respect to resources outside the isolated virtual network. The provider may support high levels of security, network isolation, and availability in such environments, enabling customers to run business-critical applications in the isolated virtual networks and experience a similar (or higher) quality of service to that achievable at customer-owned premises.

In at least some provider networks, various customers may implement network-accessible services within their respective isolated virtual networks, with the intention of vending those services to consumers whose computing devices are located outside those isolated virtual networks. Customer-owned services may have public IP addresses (i.e., addresses accessible from the public Internet) assigned to them, enabling service requests from consumers to be routed to the devices at which the services are implemented, regardless of whether the service requests originate within the provider network or outside the provider network. However, for those consumers whose service requests originate within other isolated virtual networks of the same provider network at which a given customer-owned service is implemented, accessing the service using a public IP address may require establishing connectivity between the consumers' isolated virtual networks and the public Internet, which may potentially increase the risk of Internet-based attacks.

BRIEF DESCRIPTION OF DRAWINGS

FIG. 7 illustrates an example web-based interface of a marketplace for privately-accessible services, according to at least some embodiments.

FIG. 8 illustrates an example web-based interface that enables a service consumer to transition from using a public address to access a service to using a private pathway, according to at least some embodiments.

Figure 1:
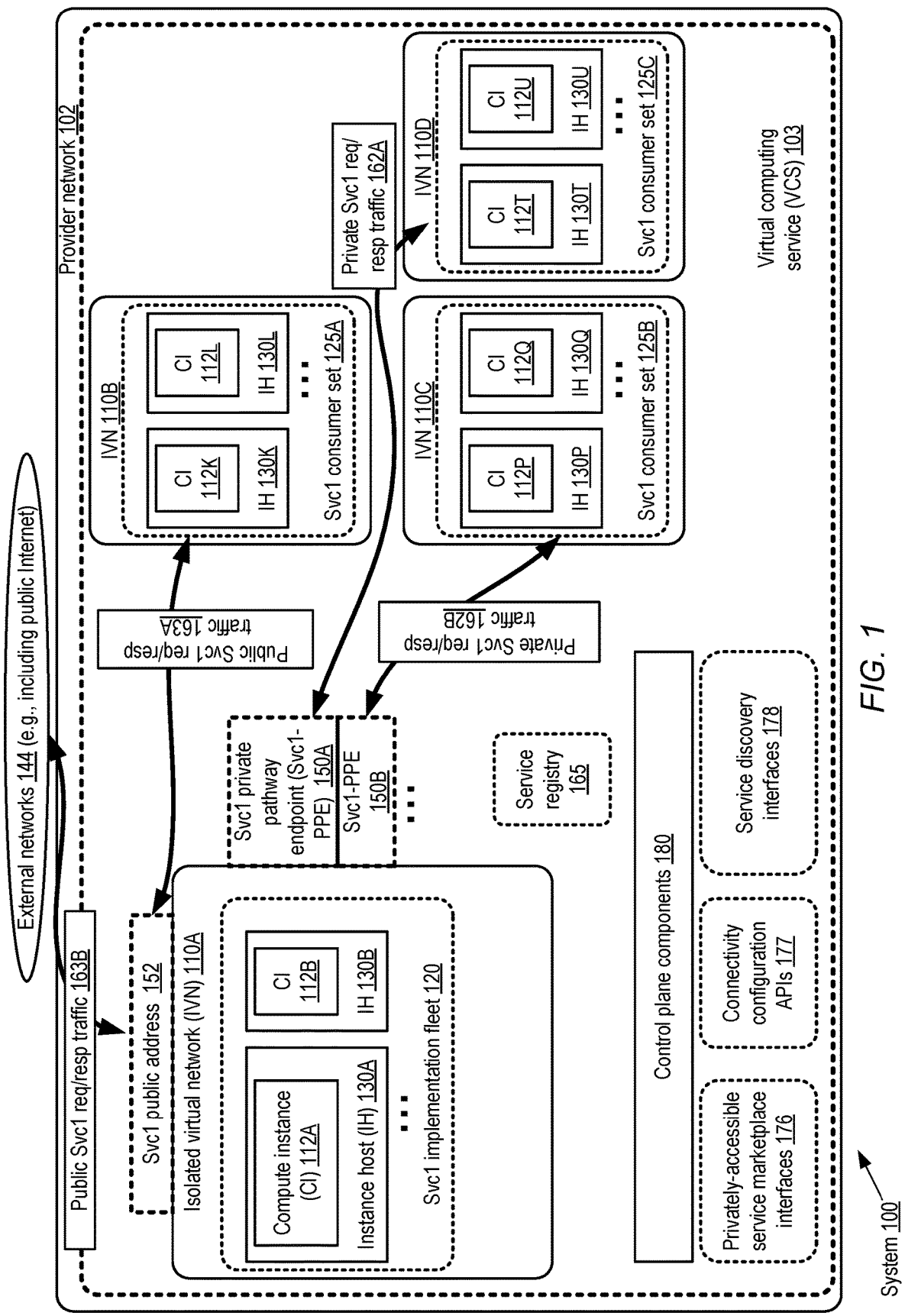
FIG. 1 illustrates an example system environment in which a service implemented within one isolated virtual network (IVN) of a provider network may be made accessible via private pathways to service consumers within other IVNs, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for the configuration, discovery and use of private endpoints for services implemented within isolated virtual networks at a provider network, and accessed from other isolated virtual networks of the provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized computer servers, storage devices, networking equipment and the like, needed to implement, configure and distribute the infrastructure and services offered by the provider. In at least some embodiments, a virtual computing service implemented at a provider network may enable clients to utilize one or more guest virtual machines (which may be referred to herein as "compute instances" or simply as "instances") for their applications, with one or more compute instances being executed on an instance host of a large fleet of instance hosts. Within large provider networks, some data centers may be located in different cities, states or countries than others, and in some embodiments the resources allocated to a given application may be distributed among several such locations to achieve desired levels of availability, fault-resilience and performance.

In at least some embodiments, a provider network may enable customers to request the establishment of "isolated virtual networks" (IVNs) at the provider's data centers. An IVN (which may also be referred to in some environments as a "virtual private cloud" or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources such as various compute instances, manage the creation of subnets within the IVN and the configuration of route tables etc. for the IVN. The term "private address" may be used herein in the context of IVN networking configuration to refer to an address which represents an endpoint (e.g., a destination or source) of a private network pathway of the provider network. The term "private network pathway" (or, more succinctly, "private pathway") may be used herein to refer to a collection of network devices and links between provider network resources, such that the devices and links are owned and managed by the provider network operator and are not accessible from the public Internet. If two compute instances are each assigned a respective private IP address, e.g., within the same IVN or at respective IVNs, entities outside the provider network may typically be unaware of the mapping between the addresses and the instances, while internal networking components of the provider network (e.g., virtualization management components which act as intermediaries between the compute instances and hardware devices) may be able to route packets between the two instances. In contrast to private IP addresses, "public" IP addresses, which may also or instead be assigned to various resources of the provider network in at least some embodiments, may be accessible from the public Internet as a result of being directly or indirectly advertised on the public Internet via BGP (the Border Gateway Protocol) or other similar protocols. In some embodiments, at least some private IP addresses assigned within a given IVN may not be visible outside that IVN, at least by default, and configuration changes of the kind described below may be required for traffic to flow between a resource in one IVN with a first private IP address, and a resource in another IVN with a second private IP address The use of private addresses may enable clients to protect their applications from potential attacks originating from the Internet, for example. IVN support may be one of the features of a more general virtual computing service (VCS) of a provider network in some embodiments. For example, the VCS may also support reservation or allocation of compute instances that are not part of an IVN, and for which the VCS (rather than the client to whom the instances are allocated) performs much or all of the networking configuration required. It is noted that at least in some embodiments, a private address (as the term is used in this document) may not necessarily be compliant with some or all of the IETF (Internet Engineering Task Force) standards pertaining to address allocation for private networks, such as RFC (Requests for Comments) 1918 (for IP version 4) or RFC 4193 (for IP version 6).

Some customers of a provider network may implement network-accessible services (different from the services such as the VCS which are implemented and owned by the operator of the provider network) using isolated virtual networks. Such customers may be referred to herein as service-implementing customers, and the corresponding services may be referred to herein as customer-owned or customer-implemented services. A particular service implemented at least in part within a particular IVN may be vended to consumers whose service requests originate either outside or inside the provider network in some cases: that is, from the perspective of the service implementer, the network location of the client devices at which service requests are generated may be immaterial for such services. For service requests originating outside the provider network, one or more public IP addresses (and/or corresponding hostnames or uniform resource identifiers) may be assigned to devices within the IVN at which the requests are to be received. For example, a customer-owned service named "SvcX" may be accessible via a publicly advertised URI such as https://SvcX.<implementer-name>.com, and the IP address for such a service may be obtained at a client device from one or more Domain Name Service (DNS) servers.

In many cases, at least some of the requests for a particular customer-owned service which is implemented at (or to be accessed via) a first IVN may originate within other IVNs. For example, a client C1 on whose behalf a particular isolated virtual network IVN1 has been established may implement a service Svc1 in IVN1, and a different client C2 may wish to send requests to Svc1 from compute instances within IVN2, a different isolated virtual network established for C2. If Svc1 only allows requests to be submitted via a public IP address, one way to establish connectivity between IVN2 and IVN1 may involve assigning one or more public IP addresses to resources within IVN2 (and/or setting up an Internet-accessible gateway for IVN2), which may be a practice somewhat counter to the isolation and security requirements of C2. Another way to establish connectivity between compute instances running in IVN2 and resources of a publicly-accessible service may be to first establish a VPN (virtual private network) connection between IVN2 and an external network owned by C2, and then send traffic indirectly from IVN2 to Svc1 via the customer network. At least in some environments, however, such VPN-based connectivity may be fairly expensive, and the indirect paths used for the traffic may not necessarily be fast enough (e.g., with respect to end-to-end latency) to meet application requirements.

Accordingly, in order to facilitate access to services across IVN boundaries, in some embodiments a provider network operator may support the establishment of private addresses (private pathway endpoints) for customer-implemented services. In such embodiments, a private address assigned to a service implemented at one IVN may enable an application running within a second IVN to send service requests to (and receive responses from) the service without having to expose the second IVN to the public Internet and without traversing network links outside the provider network. As a result of using a private address instead of using a public address, in some embodiments performance benefits as well as security benefits may be obtained: e.g., lower latencies may be achieved for packets transmitted between the IVNs using a private network pathway than if a public network pathway were used, and exposure to network attacks originating outside the service consumer's IVN may be reduced. A number of different techniques may be used to support private access to customer-implemented services in various embodiments as discussed below in further detail—e.g., in some embodiments a scalable virtual load balancer may be established as a front-end for the service, and one or more virtual network interfaces with private addresses may be assigned to the load balancer. A tunneling protocol may be used in some embodiments to encapsulate packets of traffic originating at the service consumer's IVN for transmission to the service implementer's IVN. Neither the client applications running in the consumer's IVN, nor the resources that implement the service, need necessarily even be made aware of the use of a private address for the service in various embodiments. That is, in such embodiments, no changes may be required to client applications or to the logic involved in fulfilling service requests. The configuration changes needed to enable private cross-IVN access to customer-owned services may be handled largely or fully by control-plane (administrative) components of the provider network and/or a virtual computing service (VCS) of the provider network in various embodiments.

In at least some embodiments, a registry or database with an associated namespace of services that are to be accessed across IVN boundaries using private addresses may be maintained, and a number of programmatic interfaces may be implemented to enable potential consumers of such privately-accessible services to discover or search for such services. In one embodiment, a network-accessible marketplace of such services may be established, in which various service implementers may expose information regarding the capabilities, pricing models and other characteristics of their privately-accessible services to potential customers, and provide interfaces enabling interested customers to sign up for the services. Various programmatic interfaces (e.g., web pages, application programming interfaces (APIs), command-line tools, standalone GUIs (graphical user interfaces) and the like) may be supported by the provider network for various control-plane and data-plane (e.g., non-administrative) operations associated with privately-accessible services.

According to one embodiment, a customer that has implemented (or plans to implement) a service (e.g., Svc1) within an IVN (e.g., IVN1) may submit a registration request to a control-plane component of the provider network from a client device via one such interface, indicating that the service is to be included in a namespace or database of privately-accessible services. Svc1 may support any desired programmatic interfaces for service requests (received from Svc1 clients) and/or responses (sent to Svc1 clients) in different embodiments, such as a web services interface. In response to a registration request, Svc1 may be added to the namespace (e.g., after the control-plane component has completed preliminary operations such as authenticating the request, verifying that the sender of the request is authorized to register a service and has agreed to the required service-level agreements or contracts, etc.). Svc1 may be made accessible via a marketplace interface in some embodiments after it is registered. In at least some embodiments, one or more services that are implemented using provider network resources which are not part of IVNs, but can nevertheless be reached via private networking pathways from service consumers within IVNs, may also be added to the database of privately-accessible services. Such non-IVN services may include, for example, a storage service or a database service implemented by the provider network operator and accessed from compute instances in various IVNs.

In response to respective programmatic service discovery requests, information regarding a privately-accessible service Svc1 may be transmitted to various potential clients or consumers of Svc1 in some embodiments. A number of different service discovery interfaces may be supported in various embodiments, including a marketplace interface as mentioned earlier, application programming interfaces (APIs), search tools implemented as sub-components of provider network consoles, standalone search tools, and the like. In at least some embodiments, a discovery interface may enable a potential client to indicate various desired service attributes when submitting queries, such as a desired service category, a target per-service-request price range, names of preferred businesses or organizations implementing privately-accessible services, and the like. In one embodiment, a discovery request may include an HTTP (Hypertext Transfer Protocol) request to view a list of privately-accessible services registered at a marketplace operated by the provider network. The fact that a service has been officially registered by the provider network may provide an extra level of assurance regarding the service for some potential customers.

In at least one embodiment, a service implementer client (e.g., C1) which owns a privately-accessible service Svc1 implemented at a particular IVN IVN1 may place various types of access-control restrictions on Svc1. For example, information regarding Svc1 may only be provided to specific other clients (e.g., C2, C3, and C4) or specific other IVNs (e.g., IVN2, IVN3, and IVN4) instead of being made generally available, or information regarding Svc1 may be provided to all potential clients except a specified set of blacklisted clients. In some embodiments, different departments or sub-groups of a given business or organization may have respective IVNs set up on their behalf, and a service established in one such IVN by one department may only be made accessible to the IVNs of other departments/sub-groups of that same business or organization.

In some embodiments, at least some networking configuration operations may have to be performed with respect to both ends of a service which is to be accessed across IVN boundaries: the service-implementing IVN, and the service-consuming IVN. For example, as mentioned earlier, a load balancer may be set up for the service using resources associated with the service-implementing IVN in some embodiments. In at least one implementation, the load balancer may be established at an IVN1 in response to the registration request for a service Svc1 implemented at least partly at IVN1. The load balancer may have one or more virtual network interfaces assigned to it in some embodiments, to which one or more private addresses (e.g., IPV4 (Internet Protocol version 4) or IPV6 (Internet Protocol version 6 addresses) can be assigned. In response to a request from a service-consuming client to enable access to Svc1 from a different IVN, e.g., IVN2, a particular private IP address than can be used as a destination address for packets originating in IVN2 may be generated and/or provided in some embodiments. In at least one embodiment in which cross-IVN access to Svc1 is to be provided to service consuming clients at several different IVNs such as IVN2, IVN3, and IVN4, a respective private address for Svc1 may be provided for each service-consuming IVN. Each service-consuming IVN may have its own private address range, for example, and the respective private addresses provided to the different IVNs may be selected from the corresponding private address ranges. In at least some embodiments, to enable connectivity between Svc1 (implemented at IVN1) and a particular service-consuming IVN such as IVN2, a virtual network interface associated with Svc1 may be assigned an IP address within a private address range configured for IVN2. It is noted that private access to IVN-based services may be enabled without configuring load balancers in at least some embodiments.

After the appropriate networking configuration changes have been made, service requests and corresponding responses may flow between a service-consuming IVN and the service-implementing IVN, e.g., via internal or private network links/paths which are not exposed to or accessible from the public Internet. In at least some embodiments, the control-plane of the provider network may collect various metrics associated with the use of the service via its private address(es), such as the number of requests and responses or the amount of bandwidth used for the requests and responses. Such metrics may be provided in raw or processed form, e.g., either periodically or in response to specific requests, to one or both clients involved in the cross-IVN service traffic. For example, in one embodiment the provider may generate billing entries for private service traffic based on collected metrics, and provide the billing entries to the service implementer and/or the service consumer. Programmatic interfaces for obtaining the raw or processed (e.g., summarized) metrics may be supported in various embodiments.

In at least one embodiment, metrics may be collected on a per-IP-address basis with respect to outgoing and/or incoming traffic at various resources of the provider network (e.g., for network management, auditing and/or billing purposes) regardless of whether the traffic is associated with a privately-accessed client-owned service or not. In one such embodiment, such metrics may be usable (e.g., by control-plane components of the provider network) to identify opportunities for service consumers to switch from using public addresses to using private addresses. For example, in one scenario a public IP address A.B.C.D may be assigned to a particular service Svc1 implemented at a particular isolated virtual network IVN1 by a client C1. C1 may also have registered Svc1 for private access using the techniques described above. On the basis of collected metrics, control-plane components of the provider network may be able to detect that service requests directed to A.B.C.D are being generated at a particular compute instance or device within a different isolated virtual network IVN2 belonging to a different client C2. In such a situation, the control-plane components may programmatically indicate to C2 that access to Svc1 is also available via a private address. In some embodiments, a simple (e.g., one-click) interface may be provided to enable C2 to switch to using a private address instead of A.B.C.D.

Example System Environment

FIG. 1 illustrates an example system environment in which a service implemented within one isolated virtual network (IVN) of a provider network may be made accessible via private pathways to service consumers within other IVNs, according to at least some embodiments. As shown, system 100 comprises a provider network 102 at which a one or more network-accessible services including a virtual computing service (VCS) 103 which are owned and managed by the provider network operator may be implemented. In some embodiments, each of the provider network-managed services including the VCS may comprise a plurality of hosts (such as instance hosts 130), storage devices and other computing equipment, and each of the services may include its own administrative or control-plane layer. In FIG. 1, for example, the resources of the VCS include a set of control-plane components 180 which participate in various types of configuration operations associated with the use of private addresses for customer-owned services as described below in further detail. Numerous compute instances (e.g., guest virtual machines) may be launched on behalf of various clients by the VCS control-plane components 180 in the depicted embodiment, and such compute instances may in general be utilized for any desired types of applications by the clients. The control-plane components 180 may be implemented in a distributed manner in at least some embodiments, e.g., using one or more computing devices and one or more hardware and/or software components.

Within the VCS 103, a number of different isolated virtual networks (IVNs) 110 such as IVNs 110A-110D may be established on behalf of various VCS clients. The client on whose behalf a given IVN 110 is established may be granted substantial flexibility with respect to the networking configuration of the IVN—e.g., the client may assign desired IP addresses to various compute instances 112 without having to ensure that the IP addresses do not overlap with others in use outside the IVN, set up subnets, populate route tables, and so on. As shown, each IVN may include a plurality of instance hosts (IH) 130, such as IH 130A and 130B in IVN 110A, IH 130K and 130L in IVN 110B, IH 130P and 130Q in IVN 110C, and IH 130T and 130U in IVN 110D. Instance hosts 130 may also be referred to as virtualization hosts. One or more compute instances (CIs) 112 may be instantiated at each IH 130, such as CI 112A at IH 130A, CI 112B at IH 130B, CI 112K at IH 130K, CI 130L at IH 130L, CI 112P at IH 130P, CI 112Q at IH 130Q, CI 112T at IH 130T and CI 112U at IH 130U. Each of the compute instances 112 may be used for one or more applications or application subcomponents.

In the embodiment shown in FIG. 1, the client on whose behalf IVN 110A is established may implement a network-accessible service Svc1 (e.g., a service which presents a web services interface to its clients) using an implementation fleet 120 which includes at least a subset of IVN 110A's resources. For example, CIs 112A and 112B of IVN 110A may each implement respective portions of Svc1 functionality. The service-implementing client may send a registration request to control-plane components 180 to add Svc1 to a service registry 165 of privately-accessible services—e.g., a set of services which are (a) implemented at least in part using IVN resources and (b) to be made accessible from other IVNs of the VCS 103 using endpoints of private network pathways (i.e., private addresses). A given privately-accessible service such as Svc1 need not necessarily restrict service requests to clients using private IP addresses in the depicted embodiment; for example, at least one public address 152 may also be established for Svc1. A public address such as 152 (or the corresponding URI) may be advertised or made accessible via the public Internet in the depicted embodiment, while private addresses may not be visible or accessible directly from the public Internet.

A number of compute instances in other IVNs may act as consumers of Svc1 in the embodiment depicted in FIG. 1, sending service requests to the Svc1 implementation fleet 120 and receiving corresponding responses. For example, Svc1 consumer set 125A includes CIs 112K and 122L of IVN 110B, Svc1 consumer set 125B includes CIs 112P and 112Q of IVN 110C, and Svc1 consumer set 125C includes CIs 112T and 112U of IVN 110D. In various embodiments, at least some of the Svc1-consuming IVNs may have been set up on behalf of VCS clients other than the Svc1-implementing IVN's owner, although requests for Svc1 may also originate at other IVNs set up on behalf of the service-implementing client. The IVNs at which Svc1 requests are generated may be termed Svc1-consuming IVNs.

In the embodiment shown in FIG. 1, a number of programmatic interfaces may be supported by the VCS control-plane components 180, including for example, a set of marketplace interfaces 176 for privately-accessible services such as Svc1, a set of connectivity configuration APIs (application programming interfaces) 177, and/or a set of additional (e.g., non-marketplace) service discovery interfaces 178. A potential client of Svc1 may obtain information regarding Svc1 and/or other privately-accessible services via a particular marketplace interface 176 (e.g., as a result of browsing a web page displaying available services which have been registered with the marketplace) and/or using other service discovery interfaces 178. The potential client may submit a request to establish private connectivity between Svc1 and a service-consuming IVN such as 110C or 110D using a connectivity configuration interface 177. In response to such a request, one or more control-plane components 180 may perform the needed configuration changes to enable the requested connectivity. For example, in some embodiments, a respective private pathway endpoint (PPE) 150 (e.g., Svc1-PPE 150A or 150B) may be assigned to one or more resources of Svc1 implementation fleet 120 for each Svc1-consuming IVN. As mentioned earlier, at least in some embodiments each PPE may correspond to a respective private IP address. The private addresses may be provided to at least some components (e.g., instance hosts 130 and/or compute instances 112) of the Svc1-consuming IVN as a destination for packets which contain Svc1 requests. In some embodiments, as described in further detail below with respect to FIG. 2, the Svc1 implementation fleet may include one or more load balancers, and the private IP addresses may be assigned to virtual network interfaces of such load balancers.

After the required networking configuration changes are implemented, request/response traffic via PPEs 150 may commence between the Svc1-consuming IVNs and IVN 110A at which Svc1 is implemented. For example, Svc1 request/response traffic 162A may flow between IVN 112D's consumer set 125C and Svc1 implementation fleet 120 using Svc1-PPE 150A and private pathways contained entirely within the provider network. Similarly, Svc1 request/response traffic 162B may be transmitted between IVN 112C's consumer set 125B and the Svc1 implementation fleet 120 via Svc1-PPE 150B, also utilizing private or internal pathways of the provider network which are not exposed to the public Internet. Such request-response traffic, in which requests are transmitted from one IVN to a different IVN, and responses received from the different IVN at the requesting IVN, may be referred to as "cross-IVN" or "IVN boundary-crossing" traffic herein. The control-plane components 180 may collect various types of metrics associated with Svc1 use, such as the number of requests served via the respective private addresses or PPEs 150A and 150B during a given time period, or the network bandwidth consumed for such requests. The metrics may be provided (e.g., either in raw form, processed/summarized form, or as elements of billing records) to the clients implementing the service and/or consuming the service in various embodiments.

As mentioned above, a service such as Svc1 for which private addresses or PPEs such as 150A or 150B are established for cross-IVN traffic may also support request-response traffic via one or more public IP addresses such as public address 152 in various embodiments, although the use of public IP addresses may not be a requirement in at least some embodiments. Some requests for Svc1 may originate at external networks 144 (e.g., including devices connected to the public Internet), and the request-response traffic 163B between IVN 110A and such external networks may use public IP address 152. In at least some embodiments, Svc1 consumers within one or more IVNs such as IVN 110B may also use public IP addresses such as 152 to access Svc1. For example, CIs 112K and 112L of Svc1 consumer set 125A may transmit Svc1 requests to the implementation fleet 120 via public IP address 152. In at least some embodiments, therefore, traffic between a Svc1-consuming IVN and a service-implementing IVN may use either a public IP address assigned to the service (such as address 152) or a private IP address (such as PPEs 150A or 150B), depending on the desires of the respective clients involved. In at least one embodiment, some of the request-response traffic from a given service-consuming IVN may use a private address, while another portion of the traffic may use a public address.

In some embodiments, the control-plane components 180 may be able to detect that at least some of the traffic directed to Svc1 from a service-consuming IVN is using a public address. For example, in one embodiment, one or more network metrics may be collected on a per-IP-address basis at some or all of the instance hosts 130 with respect to incoming and outgoing packets. As result of analyzing such metrics and mappings between the public and private IP addresses of various privately-accessible services which have been added to the service namespace of registry 165, control-plane components 180 may be able to identify opportunities for some Svc1 clients to transition to using private addresses/PPEs 150 instead of public addresses 152. In at least one embodiment, the control-plane components 180 may provide information about such potential public-to-private transitions to the service-consuming clients programmatically, and offer easy-to-use interfaces (such as 1-click interfaces) which can be used by clients to request the corresponding changes. For example, if such a request to transition from using public address 152 to a private address were received with respect to Svc1 consumer set 125A of IVN 110B, in some embodiments a third private IP address may be assigned to Svc1 and used for subsequent traffic between Svc1 implementation fleet 120 and the consumer set 125A.

In some embodiments, a 1:1 relationship may exist between the number of distinct private addresses assigned to a service, and the number of IVNs from which requests for that service are to be supported via private pathways of the VCS. In other embodiments, instead of a 1:1 relationship, an M:1 relationship may be possible—e.g., a given service may expose multiple private addresses that can be used from a service-consuming IVN. In at least one embodiment, more than one service-consuming IVN may share a single private address—e.g., a 1:N mapping may be possible between the private addresses and the service-consuming IVNs. It is noted that in much of the remainder of this document, the terms "private address" and "private IP address" are used as synonyms for the term "private pathway endpoint".

Load Balancers with Virtual Network Interfaces

Figure 2:
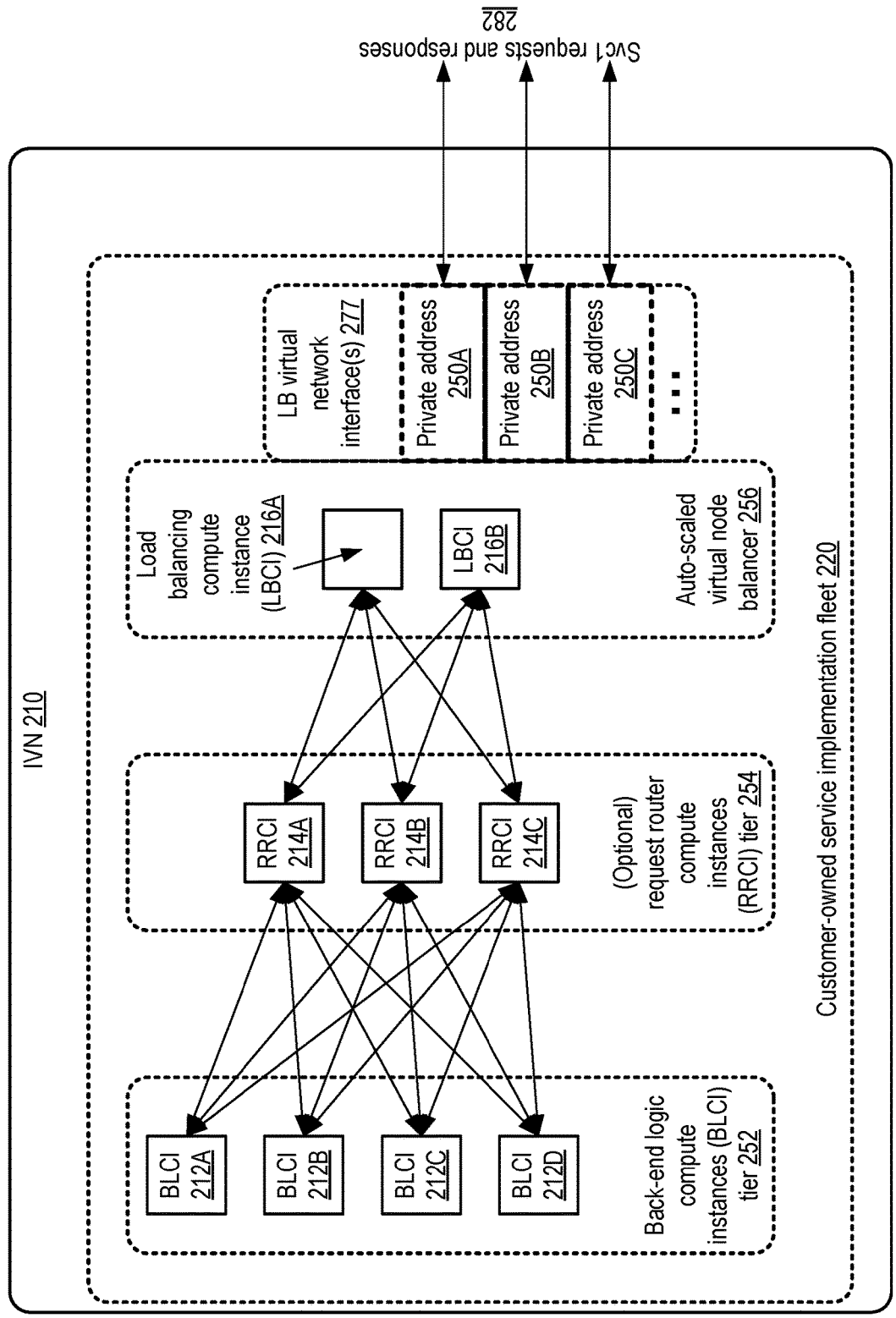
FIG. 2 illustrates an example configuration in which a load balancer with one or more virtual network interfaces may be established as a front-end for a service to be accessed via a private network address, according to at least some embodiments.

FIG. 2 illustrates an example configuration in which a load balancer with one or more virtual network interfaces may be established as a front-end for a service to be accessed via a private network address, according to at least some embodiments. In the depicted embodiment, a service implementation fleet 220 may comprise several logical or functional layers or tiers. Much of the business logic of the service being implemented at IVN 210 may be executed at a back-end logic compute instance tier 252. Service requests (e.g., from service-consuming IVNs) may be received at a front-end auto-scaled virtual load balancer 256, and distributed among compute instances configured at request router compute instances (RRCIs) 214 (e.g., 214A-214C) of an intermediary tier 254 according to a selected load balancing algorithm. Any of a variety of load balancing algorithms may be used in different embodiments, such as random selection, round-robin selection, selection based on lowest estimate workloads, and so on. It is noted that at least in some embodiments, an intermediary tier 254 of request routers may not be required; instead, for example, the load balancer may itself distribute the received service requests among back-end logic compute instances (BLCIs) 212 (e.g., 212A-212D).

As shown, the auto-scaled load balancer 256 may comprise several different compute instances (LBCIs 216, including 216A and 216B) working collectively to distribute the service workload. The number of LBCIs of the load balancer may be adjusted dynamically to scale with the service's workload in at least some embodiments. In one embodiment, a scalable load balancing service may be implemented at the provider network at which IVN 210 is established, and such a service may be used to manage the load balancer for a privately-accessible service. Such a service may add or remove instances from the load balancer, replace one LBCI with another in the event of a failure, and so on.

In the depicted embodiment, one or more virtual network interfaces 277 may be attached to the load balancer 256, e.g., in response to a configuration request or a request to register the service as a privately-accessible service. A virtual network interface may comprise a logical entity with a set of networking and security-related attributes that can be attached to (or detached from) one or more compute instances (such as the load balancer compute instances 216A and/or 216B) programmatically. For example, at least one private or public IP address IPAddr1 may be assigned to a given virtual network interface VNI1, and security rules restricting inbound and outbound traffic may be set for VNI1. When that VNI is programmatically attached to a given compute instance LBCI1 launched at an instance host with a physical network interface card NIC1, network packets indicating IPaddr1 as their destination address (and complying with the security rules) may be received at LBCI1 via NIC1. In addition, outbound packets generated at LBCI1 may indicate IPaddr1 as their source address and may be physically transmitted towards their destinations via NIC1. If VNI1 is then programmatically detached from LBCI1 and attached to a different compute instance LBCI2 (which is executing at a different instance host with a different physical network interface card NIC2), the IPaddr1 traffic that was previously being received at LBCI1 may now be received at LBCI2, with the same security rules in place.

Generally speaking, support for virtual network interfaces may considerably simplify network configuration tasks at a virtual computing service. In at least some embodiments, a single IP address may be assigned to a group of virtual network interfaces, and/or traffic associated with the respective IP addresses assigned to several different VNIs may be directed to a single compute instances. Thus, various types of mappings may be supported in different embodiments between virtual network interfaces, IP addresses, and compute instances. In the embodiment depicted in FIG. 2, private IP addresses 250A, 250B and 250C have been assigned to the one or more virtual network interfaces attached to load balancer 256. Depending on the mapping between service-consuming IVNs and the private addresses 250, traffic from one or more service-consuming IVNs may use each of the private addresses 250. In one example scenario, for example, private address 250A may belong to an address range configured at and accessible from a first service-consuming IVN, private address 250B may belong to an address range accessible from a second service-consuming IVN, while private address 250C may belong to an address range accessible from a third service-consuming IVN. It is noted that in some embodiments, dedicated hardware load balancers may be used instead of virtual load balancers implemented using compute instances. In at least one embodiment, virtual network interfaces and/or load balancers may not be used.

Example Control-Plane Interactions

Figure 3:
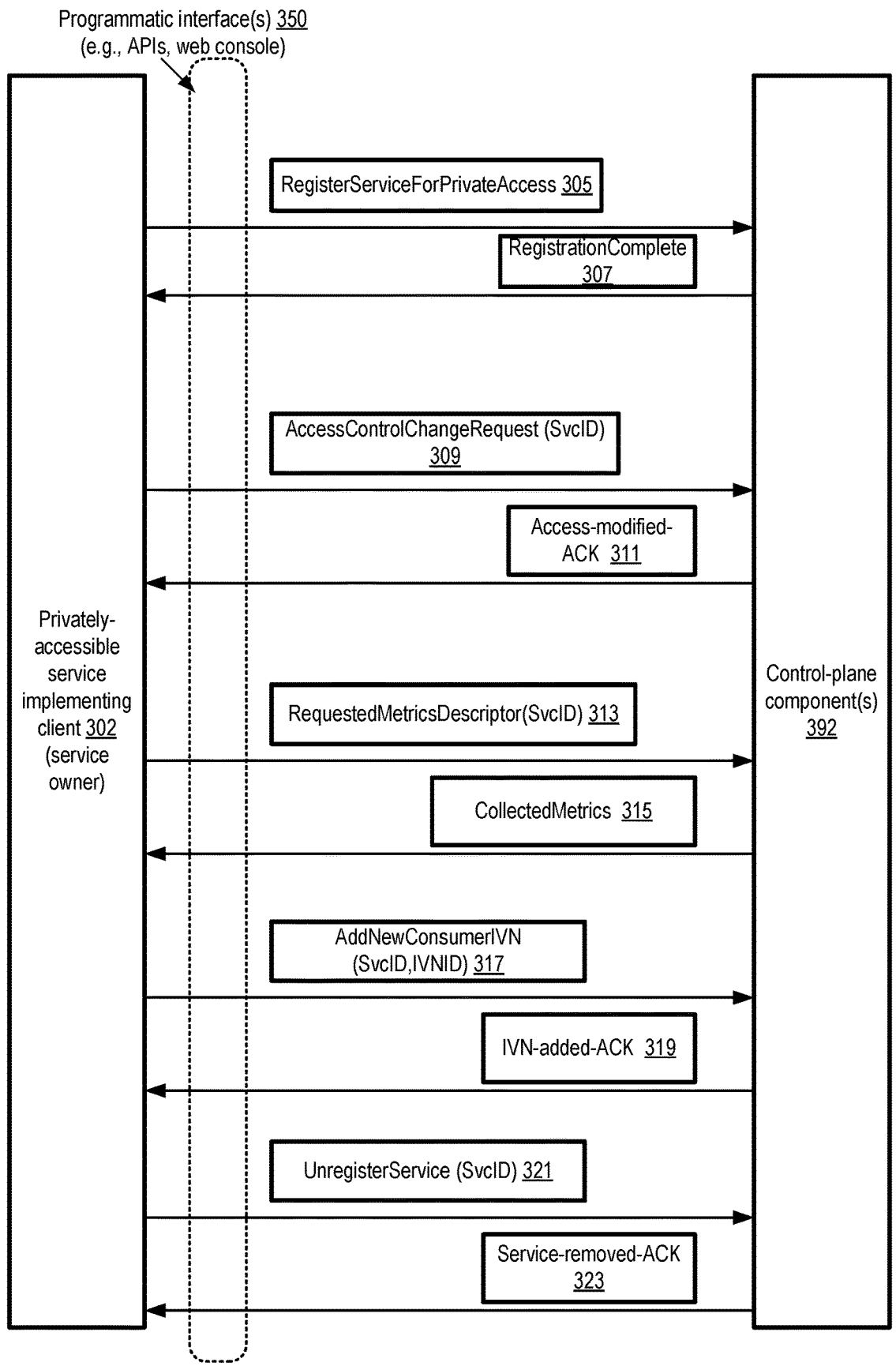
FIG. 3 illustrates example interactions between a service-implementing client and control-plane components of a provider network, according to at least some embodiments.

FIG. 3 illustrates example interactions between a service-implementing client and control-plane components of a provider network, according to at least some embodiments. At least some resources of an IVN established on behalf of client 302 may be configured to respond to service requests received from outside the IVN for a particular service. The control-plane components of the provider network (e.g., control-plane components of a virtualized computing service) may implement a set of programmatic interfaces 350, such as APIs, web-based consoles, command-line tools and the like. The service owner 302 may submit a RegisterServiceForPrivateAccess request 305, indicating various details regarding the service being implemented at the service owner's IVN, such as a set of resources to which service requests should be directed using load balancing. In response, the control-plane components 392 may perform one or more configuration operations, such as establishing a virtual or physical load balancer of the kind illustrated in FIG. 2, and adding a record representing the service to a namespace of a registry or database of privately-accessible services. In one implementation, if a load balancer has already been configured for the service, a new load balancer may not have to be established. In some embodiments, one or more virtual network interfaces may be assigned to the service (e.g., by attaching the VNI(s) to the load balancer compute instances) at this stage. In one embodiment, because the particular private address to be used for service-related traffic to a service-consuming IVN may have to be selected only after the service-consuming IVN is identified, the virtual network interfaces established in response to a registration request may not have any private addresses assigned (or a default private IP address which does not necessarily lie within the IP address range of any service-consuming IVN may be assigned). After the configuration operations are initiated or completed, the control-plane components may respond with a RegistrationComplete message 307 in the depicted embodiment.

In at least some embodiments, a service owner 302 may not wish to expose the service being implemented at its IVN to a general audience; instead, information about the service may be restricted to some set of entities selected by the service owner. These kinds of restrictions may be desired, for example, if the service is implemented by one department of an organization and is to be usable only from respective IVNs established for other departments of the same organization, if the service owner intends to restrict the use of the service to some particular set of clients, or if the service owner intends to prevent one or more entities (e.g., competitors of the service owner) from using the service. In some embodiments, an AccessControlChangeRequest 309 may be transmitted by the service owner, indicating (e.g., using the SvcID parameter) the service for which access control settings are to be modified, the particular changes requested, and so on. In response, the control-plane components 392 may make the corresponding metadata changes, e.g., in the registry of privately-accessible services, and send an acknowledgement message 311 back to the service owner indicating that the requested changes have been implemented.

In the embodiment depicted in FIG. 3, service owners may indicate their preferences regarding the types of metrics (if any) to be provided to them with respect to a particular privately-accessible service using a RequestedMetricsDescriptor message 313. For example, the service owner may specify the granularity of the metrics to be provided (e.g., request-count granularity, bytes transmitted in each direction, temporal distribution of traffic, etc.), how frequently the metrics are to be provided, and so on. The control-plane components may record the metrics preferences in a metadata collection for privately-accessible services, and use the preferences to schedule the reporting of raw and/or processed metrics via CollectedMetrics messages 315 in the depicted embodiment.

In at least some embodiments, a service owner may be granted the right to deny access to the service to any particular potential client or service-consuming IVN, or may explicitly approve new consumer IVNs for the service. In one such embodiment, the service owner may submit an AddNewConsumerIVN request 317 indicating the IVN identifier (or some other identifier) of an approved consumer. In response, the control-plane components 392 may perform the needed configuration to enable service request/response traffic to flow between the new consumer's IVN and the service-implementing IVN, and send an acknowledgement message 319 indicating that the new consumer has been added to the set of enabled consumers of the service. In some embodiments, for example, the configuration changes may include identifying a new private IP address which is accessible from within the consumer's IVN, and assigning that address to the service (e.g., to a virtual network interface assigned to a load balancer of the service).

If and when a service owner wishes to terminate private access to a service, an UnregisterService request 321 may be sent to control-plane components 392 in the depicted embodiment. In response, the service may be removed from the namespace into which it had been inserted in response to the RegisterServiceForPrivateAccess request 305. In implementations in which load balancers and/or virtual network interfaces had been established specifically to enable private access to the service, the load balancers and/or virtual network interfaces may be de-configured. An acknowledgement message 323 indicating that the service has been removed from the set of registered services may be sent to the service owner in some embodiments.

Figure 4:
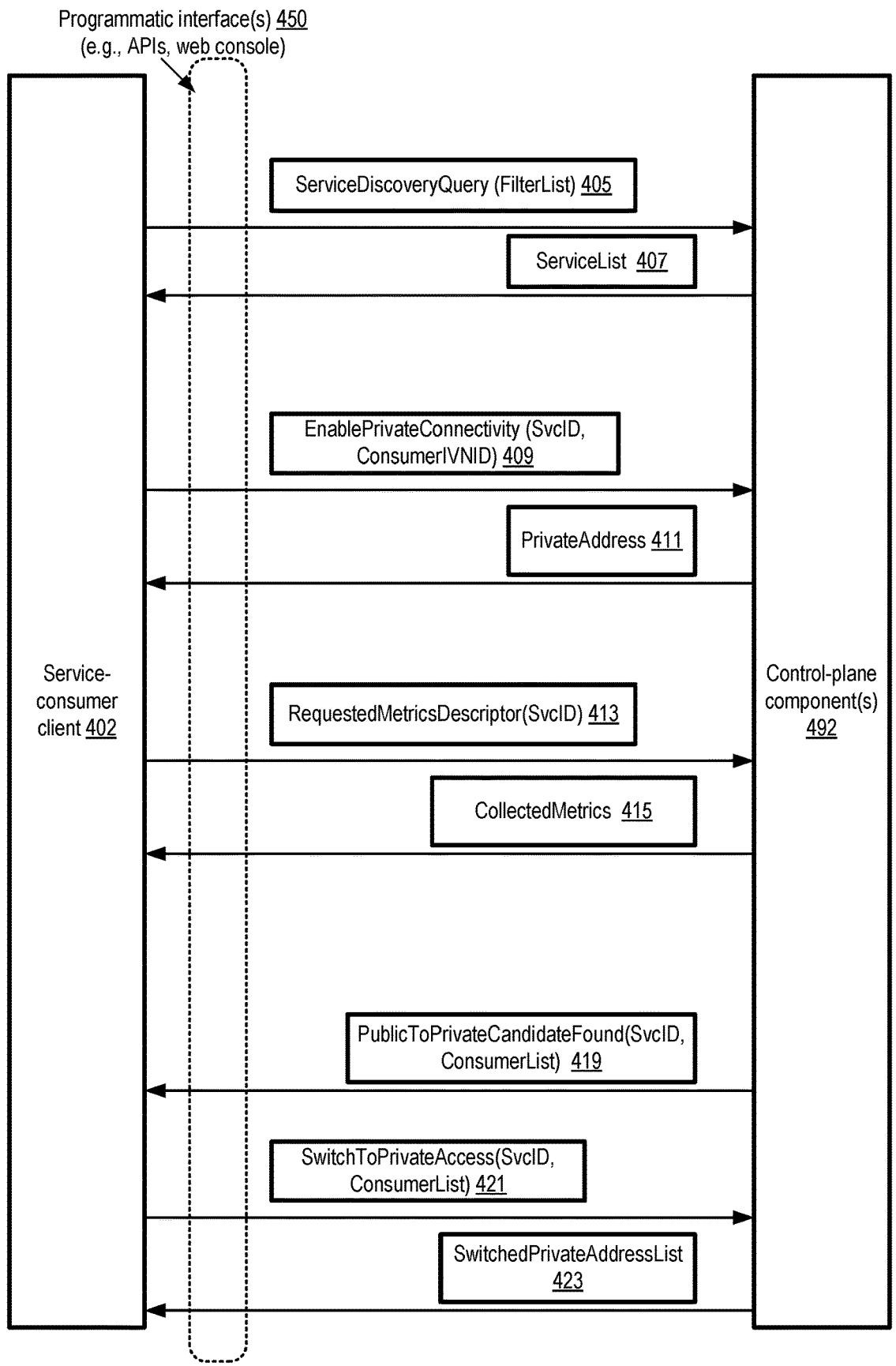
FIG. 4 illustrates example interactions between a service consumer client and control-plane components of a provider network, according to at least some embodiments.

FIG. 4 illustrates example interactions between a service consumer client and control-plane components of a provider network, according to at least some embodiments. A set of programmatic interfaces 450 (such as web pages or consoles, APIs, command-line tools, GUIs, and the like) may be supported by the control-plane components 492 for service consumers. Using one such interface, a service consumer client 402 may submit a ServiceDiscoveryQuery message 405, optionally indicating a filter list indicating some set of desired predicates or attribute values of the services for which information is being requested. In some embodiments, a network-accessible marketplace's search interface may be used for such a query. In response, the control-plane components 492 may look up services with the desired characteristics and provide a ServiceList response 407 indicating the services (if any) that match the FilterList. Of course, a null or empty FilterList may be submitted by the service consumer in some embodiments, in which case the control-plane components 492 may transmit a list of some selected subset or all of the registered services which can be accessed via private endpoints.

If/when the service consumer wishes to access a particular service, an EnablePrivateConnectivity request 409 may be submitted, indicating for example the service identifier and the consumer's IVN identifier. In response, the control-plane components may implement any required configuration changes to enable the connectivity. In some embodiments, such changes may include, for example, assigning a private IP address to a virtual network interface associated with a front-end node such as a load balancer of the targeted service, adding a record of the service's private IP address to a networking metadata collection of the consumer IVN, etc. After the configuration changes have been initiated or completed, one or more private addresses of the targeted service may be provided in a PrivateAddress message 411 by the control-plane components 492. In some embodiments, the control-plane components 492 may obtain the service owner's approval programmatically (e.g., in the form of a message similar to the AddNewConsumerIVN message shown in FIG. 3) before responding positively to the EnablePrivateConnectivity message. In at least one embodiment, the EnablePrivateConnectivity message or its equivalent may be sent (either by the service consumer client 402, or by the control-plane components 492 on behalf of the service consumer) to the service owner to obtain explicit approval from the service owner before the control-plane components 492 perform configuration changes to enable the requested connectivity.

In at least some embodiments, the service consumer may indicate preferences regarding the types of metrics (if any) that are to be provided regarding the consumption of the privately-accessible service using a RequestedMetricsDescriptor message 413. A RequestedMetricsDescriptor message from a service consumer may be handled by the control-plane components 492 in a manner analogous to RequestedMetricsDescriptor messages received from service owners, which were discussed above with respect to FIG. 3, except that the scope or coverage of the metrics provided to the service consumer may be limited to its own usage of the service, whereas the service owner may be able to view metrics pertaining to a plurality of consumers. The control-plane components may record the metrics preferences of the consumer in a metadata collection for privately-accessible services, and use the preferences to schedule the reporting of raw and/or processed metrics via CollectedMetrics messages 415 in the depicted embodiment.

The control-plane components 492 may be able to detect that traffic from a particular consumer IVN is being directed to a service via a public address of the service in some embodiments. If that service is registered as a privately-accessible service, the control-plane components may transmit a message to the service consumer, indicating that it is possible for the consumer to switch to using a private address of the service instead of the public address. Such a PublicToPrivateCandidateFound message 419 may indicate, for example, the particular service (with identifier SvcID) for which the transition from public to private access is possible, and a list (ConsumerList) of the service consuming compute instances that are currently using the public address in the depicted embodiment. If the consumer client 402 wishes to start using private access, a SwitchToPrivateAccess message 421 may be sent to the control-plane components 492. In some embodiments, the control-plane components may send back a list of the private addresses which can be used by the respective consumer compute instances in a SwitchedPrivateAddressList message 423. The private addresses indicated in the SwitchedPrivateAddressList may first be determined and assigned to the service if required (e.g. if private addresses associated with the service have not yet been set up for the IVNs of the consumers)—i.e., the control-plane components may have to perform one or more configuration operations to enable the transition to private access. In at least one embodiment, the control-plane components may be able to intercept and modify the packets from the consumer compute instances so that the packets are sent to the private addresses instead of the public addresses, without requiring any application-level changes at the consumer compute instances.

In various embodiments, other types of requests than those shown in FIG. 3 and FIG. 4 may be submitted by service owners or service consumers to control-plane components, or some of the request types shown may not be supported. The contents of several different requests may be combined into one request in some embodiments—e.g., access control requirements of a service owner may be included in a request to register a service. The names and parameters of the requests and responses may differ in various embodiments from the example names and parameters shown in FIG. 3 and FIG. 4.

Automated Detection of Private Service Access Opportunities

Figure 5:
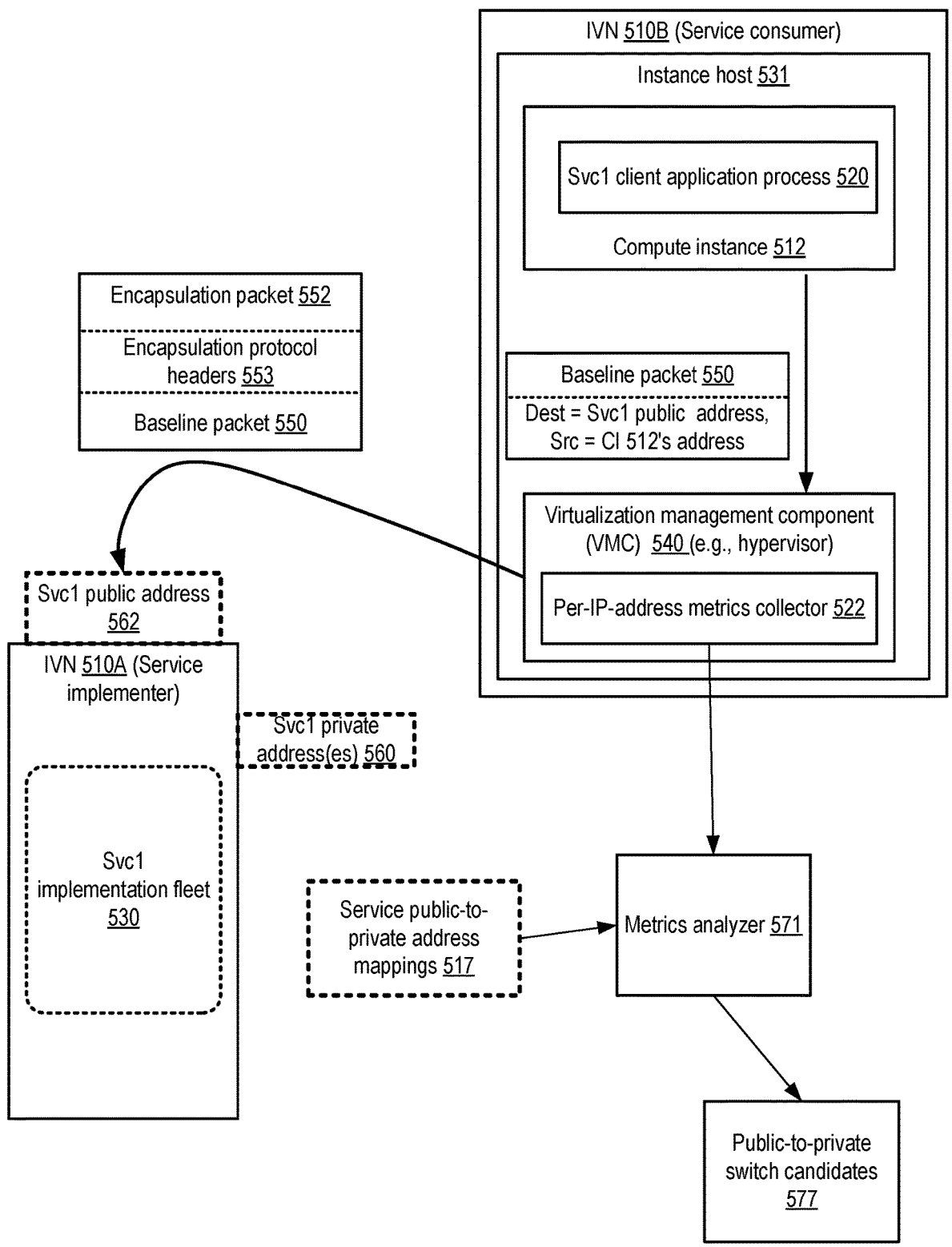
FIG. 5 illustrates example provider network components which may participate in the automated detection of opportunities for switching between public and private access to a service implemented at an IVN, according to at least some embodiments.

As mentioned above, in some embodiments, possibilities for switching from the use of public addresses to private addresses for accessing a given service may be identified in an automated manner. FIG. 5 illustrates example provider network components which may participate in the automated detection of opportunities for switching between public and private access to a service implemented at an IVN, according to at least some embodiments. In the depicted embodiment, a service Svc1 is being implemented at least in part using a fleet 530 of resources of an IVN 510A. Svc1 exposes a public address 562 to which services requests can be directed. Svc1 is also registered as a privately-accessible service, with one or more private addresses 560 established for requests originating at one or more other IVNs.

IVN 510B comprises an instance host 531 at which one or more compute instances including compute instance 512 runs. Compute instance 512 includes an application process 520 which is a client of Svc1 (i.e., the application process generates Svc1 requests). Instance host 531 also includes a virtualization management component (VMC) 540, which may for example include a hypervisor and/or an administrative operating system instance running in a privileged domain. The VMC may represent one component of the control-plane of the virtual computing service at which the IVNs 510 are established. The VMC 540 acts as an intermediary between the compute instance 512 and the hardware components (e.g., the processor(s), memory, storage devices, network interface cards (NICs) and the like) of the instance host 531. In particular, the VMC intercepts baseline network packets (e.g., 550) generated at the compute instance 512 and produces corresponding encapsulation packets (e.g., 552) in accordance with an encapsulation protocol of the virtual computing service. An encapsulation packet 552 may include one or more encapsulation protocol headers 553 generated by the VMC 540, as well as at least some of the contents of the corresponding baseline packet 550. The VMC 540 transmits the encapsulation packets on towards their destinations using a NIC of the instance host 531. The reverse transformation (e.g., extracting a baseline packet from a received encapsulation packet) may be performed at the VMC for packets directed to the compute instance in the depicted embodiment. The encapsulation protocol may be implemented, for example, at least in part because multiple compute instances (each with one or more IP addresses and/or one or more virtual network interfaces) may typically be established at a given instance host, and traffic to/from those instances may have to be mapped to the addresses assigned to the NICs of the instance host.

In the depicted embodiment, the VMC 540 includes a Per-IP-address metrics collector 522. As indicated by the name, the metrics collector 522 tracks network traffic at the IP address granularity, so that for example it is able to generate a list of destination IP addresses indicated in outgoing packets generated at compute instance 512, and/or a list of source IP addresses indicated in packets directed to compute instance 512. If a baseline packet 550 used for Svc1 requests indicates Svc1's public address 562 as its destination, the metrics collector 522 may add a record indicating the use of the public address to its metrics.

A metrics analyzer 571 (e.g., another control-plane component) may obtain the metrics from the collector 522. The analyzer 571 may determine, using a service public-to-private address mapping 517, whether any of the compute instances such as 512 of IVN 510B are using public addresses of services that also provide private accesses. If such compute instances are found, they may be designated as public-to-private switch candidates 577 in the depicted embodiment. A programmatic indication that it is possible to start using a private IP address for Svc1 instead of the public IP address may be provided to the client on whose behalf IVN 510B is established. If the client (and the service owner) agree, the required configuration changes may be made, so that for example subsequent Svc1-related request/response traffic between compute instance 512 (and/or other instances in IVN 510B) and the service implementation fleet 530 flows using a private address 560 assigned to Svc1. In some cases, for example, a new private address 560 may have to be assigned to Svc1 to enable connectivity between the IVNs 510A and 510B.

Privately-Accessible Services Implemented Using External Resources

Figure 6:
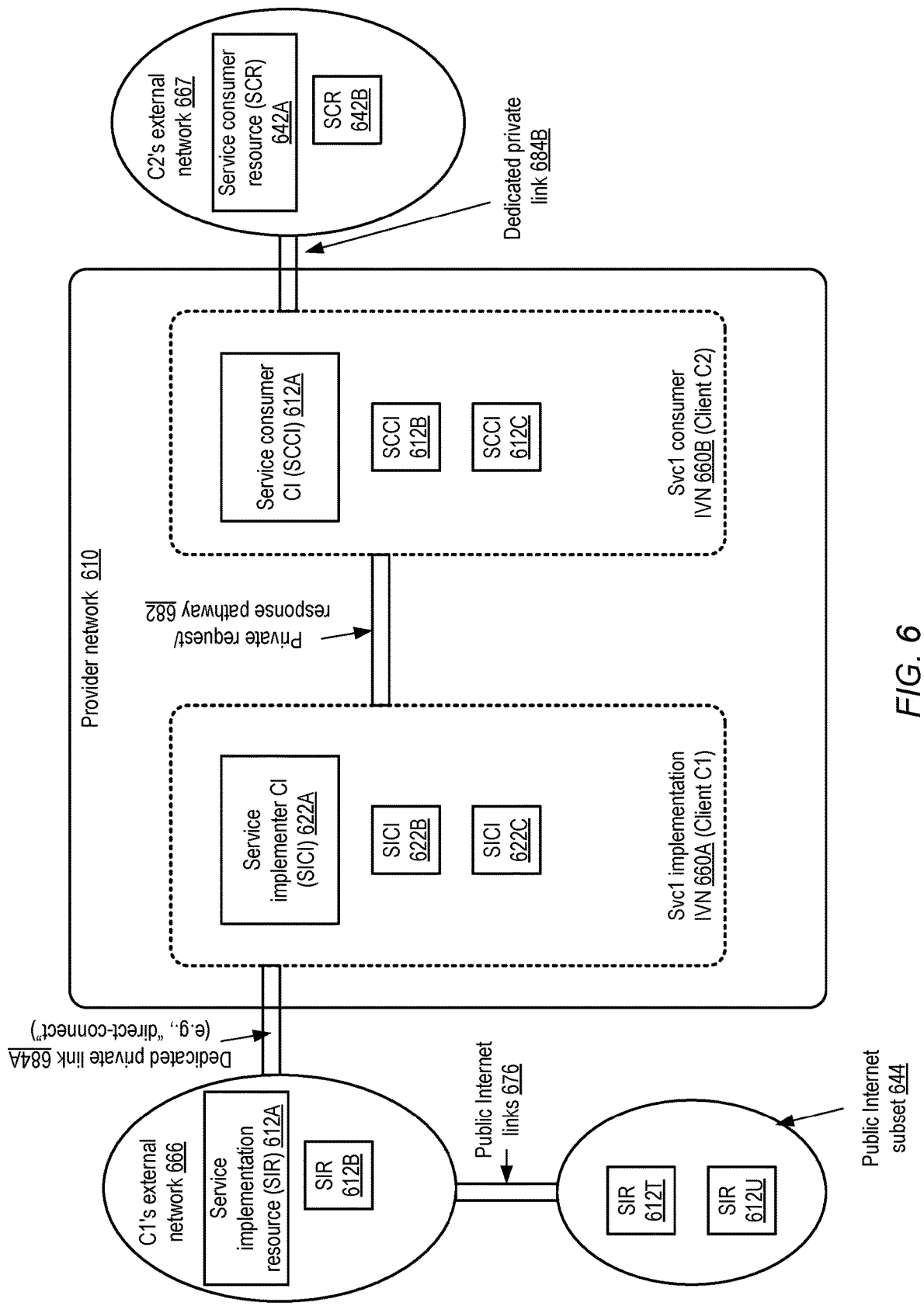
FIG. 6 illustrates an example of a privately-accessible service which may be implemented at least in part outside an IVN, according to at least some embodiments.

In some scenarios, not all the resources required to implement a service may be available within a provider network. A service owner may nevertheless be able to benefit from the security and/or performance advantages of using private endpoints for their request/response traffic in at least some embodiments. FIG. 6 illustrates an example of a privately-accessible service which may be implemented at least in part outside an IVN, according to at least some embodiments. An IVN 660A has been established for a client C1 of a provider network 610, and a different IVN 660B has been established for another client C2. Client C1 implements a service Svc1 which is implemented using a combination of three types of resources: compute instances of IVN 660A, resources located at C1's external network 666, and resources located at devices 644 reachable from C1's external network via the public Internet. For example, service-implementing compute instances (SICIs) 622A, 622B and 622C in IVN 660A may collaborate with service implementation resources (SIRs) 612A and 612B of the external network 666 and with SIR 612T and 612U on the Internet to fulfill service requests in the depicted embodiment.

In some embodiments, provider networks such as 610 may support one or more options for secure and/or dedicated connectivity between IVNs 660 and external networks or client premises. For example, a dedicated private physical network link may be established between routers owned/managed by the provider network operator and routers owned/managed by a customer in some embodiments, with both types of routers housed at a router co-location facility. Such dedicated private physical links may also be referred to as "direct connect" links. In the depicted embodiment, one such direct connect link 684A is used for secure connectivity between client C1's network 666 and IVN 660A, so that for example internal communications related to the service being implemented at SICIs 622A 622C and SIRs 612A and 612B do not have to travel over shared links. For some aspects of the service functionality, SIRs 612A and 612B may communicate via public Internet links with SIRs 612T and 612U.

Some of the resources at which the service functionality is to be utilized or consumed may also be located outside IVNs in various embodiments. For example, in the embodiment shown in FIG. 6, a set of service consumer compute instances (SCCIs) 612 such as 612A-612C may be located within IVN 660B established for client C2, and addition service consumer resources (SCRs) such as 642A and 642B may be located at C2's external network 667. Svc1 may have been registered as a privately-accessible service with IVN 660A as the IVN to which service requests are to be directed, and with IVN 660B as one of the consumer IVNs for which connectivity has been enabled to Svc1 via private request/response pathway 682. The private pathway 682 may comprise, for example, network links and devices owned, secured and managed by the provider network operator. A dedicated private physical link (e.g., a direct connect link) 684B may be established between the external network 667 and IVN 660B for traffic associated with Svc1.

In one embodiment, some of the resources within IVNs 660A and 660B may act as intermediaries for the corresponding service requests and/or responses received at the IVNs. For example, SICIs 622 may collectively implement a load balancer for requests received via pathway 682, with at least some of Svc1's business logic being implemented in external network 666. Similarly, at least some of the requests for Svc1 may be generated at resources in external network 667, with SCCIs 622 acting as forwarding agents for the requests and responses. In some embodiments, dedicated physical links may not be required between the external resources participating in the implementation (or consumption) of the service, and the resources implementing (or consuming) the service within the provider network 610. In at least one embodiment, a virtual private network (VPN) may be established between clients' external networks and the IVNs.

In some embodiments a provider network may be organized into a plurality of geographical regions, and each region may include one or more availability containers, which may also be termed "availability zones". An availability container in turn may comprise one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications and/or services may be protected from failures at a single location by launching multiple application instances in respective availability containers. In one embodiment, for example, a particular privately-accessible service may be implemented at several different IVNs located in respective availability containers, with respective private endpoints configured for each of the IVNs. In such a scenario, consumers of the service may be able to continue using the service even if a large scale failure event makes one of the IVNs implementing the service unreachable.

Using the kinds of connectivity options and distributed service implementation architectures illustrated in FIG. 6 and discussed above, a wide variety of robust and fault-tolerant services with private request/response pathways may be engineered in different embodiments. For example, various services implemented separately outside the provider network may be combined into a higher-level or aggregated service, with access to the aggregated service provided via the provider network's private network pathways and controlled with the help of the provider network's control-plane.

Interfaces for Privately-Accessible Services

In some embodiments, a provider network operator may establish a marketplace to simplify the discovery and use of various services. FIG. 7 illustrates an example web-based interface of a marketplace for privately-accessible services, according to at least some embodiments. As mentioned earlier, in one embodiment some privately-accessible services may be implemented using resources within IVNs established for customers of the provider network, while other privately-accessible services may be implemented by the provider network operator (and may not use resources within IVNs established for customers). Such provider network operator-implemented services may include, for example, storage services, machine learning services, database services and the like to which service requests may be directed using respective sets of programmatic interfaces from service consumers within customer-owned IVNs. As shown, web page 701 of the interface may include a message area 704 and layout regions 710 and 713. Message area 704 may provide a general overview of the marketplace and the benefits of using private addresses/pathways to access services. In addition, message area 704 may also include guidelines as to how additional information about marketplace services may be obtained, and/or guidelines regarding service discovery or search options.

Layout region 710 may list and provide links for various popular service categories. For example, links to web log analysis services WLASvc1 and WLASvc2 are shown, as are links to social media sentiment analysis service SASvc1 and a health management service HSvc1. Button interface 711 may be clicked to obtain a list of all available services of the marketplace in the depicted embodiment.

Layout region 713 may be used for service discovery. Four types of filters for service searches are provided by default in the depicted embodiment. Searches by service name, service provider name, service category and/or per-request price range are enabled respectively by elements 716, 719, 722 and 725 of region 713. If a potential service customer wishes to construct a custom query instead of using some combination of the default filters, button 727 may be clicked to reach a query editor in the depicted embodiment. In one embodiment, searching for services based at least in part on quality of service metrics such as performance levels (e.g., throughput or latency of service requests), availability levels, and the like may also be supported.

As mentioned earlier, in some embodiments provider network control-plane components may automatically detect opportunities for service customers to start using private addresses of services which they (the service customers) are already accessing via public addresses. FIG. 8 illustrates an example web-based interface that enables a service consumer to transition from using a public address to access a service to using a private address, according to at least some embodiments. Web page 801 of the interface includes a message area 804 and a region 813 in which information about candidates for transitioning from public to private addresses may be displayed.

Message area 804 may include a statement indicating that analysis of network traffic has led to a determination that one or more services that are registered for private access are currently being accessed from some set of compute instances using a public address. In table 816 of region 813, respective rows indicate the names and/or URIs of the services, the customer's IVN from which service requests have been sent to the public addresses of the services, the particular compute instances at which such requests have been generated, and/or the number of such requests detected during some recent time interval such as a week. The "switch-to-private" buttons in table 816 may be used by customers to request the configuration changes needed to use private service addresses for service requests from the corresponding compute instances and/or IVNs. Providing a single-click interface for such transitions (or other simplified interfaces), instead of a sequence of interactions with the provider network, may significantly increase the likelihood that customers will migrate to using private endpoints in various embodiments. In at least one embodiment, after a customer clicks on a "switch-to-private" button, the provider network's control-plane components may make all the necessary configuration changes, including for example enabling the appropriate virtualization management components to start replacing the destination address of service request packets with the private address of the service, and no application-level changes may be required from the consumer perspective. It is noted in different embodiments, the layout and/or content of web-based interfaces associated with privately-accessible services and service marketplaces may differ from those illustrated in FIG. 7 and FIG. 8.

Methods for Supporting Private Cross-IVN Service Access

Figure 9:
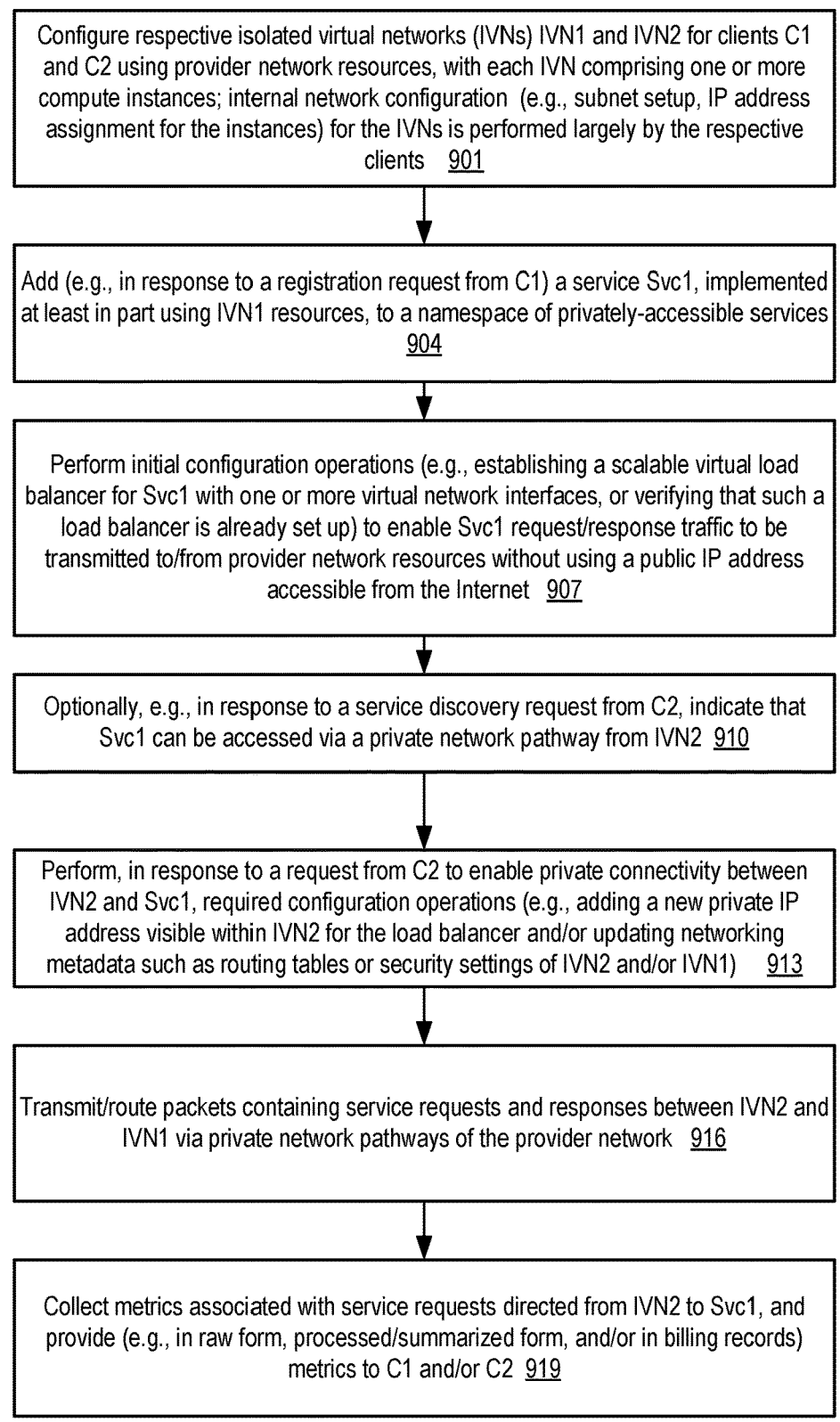
FIG. 9 is a flow diagram illustrating aspects of operations that may be performed to enable services to be accessed across IVN boundaries of a provider network using private pathways, according to at least some embodiments.

FIG. 9 is a flow diagram illustrating aspects of operations that may be performed to enable services to be accessed across IVN boundaries of a provider network using private pathways, according to at least some embodiments. As shown in element 901, isolated virtual networks IVN1 and IVN2 may be established on behalf of clients C1 and C2 respectively at a provider network. Each IVN may comprise, among other resources, some set of compute instances or guest virtual machines instantiated at a set of instance hosts managed by a virtual computing service (VCS) of the provider network. Network configuration choices (e.g., IP address assignment, subnet configuration, security rules pertaining to incoming and outgoing traffic, etc.) within the IVNs may be made by the respective clients independently of each other, and respective sets of networking metadata indicative of the choices may be maintained for each IVN. For example, C1 may choose a range of network addresses to be assigned to compute instances within IVN1, and C2 may choose a range of network addresses for compute instances of IVN2, which may or may not overlap with the address range chosen by C1 for IVN1. By default, in at least some embodiments, the private addresses being used in IVN2 may not be advertised to or accessible from IVN1, and similarly the private addresses being used in IVN1 may not be advertised to or accessible from IVN2.

C1 may implement a network-accessible service Svc1 using at least some resources of IVN1 in the depicted embodiment. Other resources outside IVN1 (e.g., at C1's own facilities or premises, which may be linked to the provider network via dedicated private links in some embodiments) may also participate in implementing Svc1 in some embodiments. As shown in element 904, Svc1 may be added to a namespace of privately-accessible services, for example in response to a registration request received from C1 at a control-plane component of the provider network. The control-plane components of the provider network may implement a set of programmatic interfaces for configuration and management of private access to services in various embodiments, such as APIs, one or more web-based consoles, command-line tools and the like, and a registration request may be received via one such interface. In some embodiments, services such as Svc1 that have been registered may be included or advertised in a network-based marketplace of privately-accessible services implemented by the provider network, e.g., so that prospective clients may be able to compare the offerings of various services, sign up for the services, and so on.

In some embodiments, a first set of configuration operations may be performed when a service such as Svc1 is added to the namespace or registry (element 907) of privately-accessible services. The configuration operations performed at this stage may be considered prerequisites for establishing connectivity between Svc1 and other components of the provider network outside IVN1 via private addresses, e.g., without using an address which is accessible from and advertised to the public Internet. For example, in one embodiment, a load balancer may be configured as a front-end component of the service, with one or more virtual network interfaces attached to the load balancer. The virtual network interface(s) may be assigned private network addresses that are visible within and accessible from other IVNs (and/or from other provider network resources which may not be in other IVNs). In some embodiments, the service may already have one or more such load balancers set up, in which case the configuration operations at this stage may involve verifying that the existing load balancers are configurable with private IP addresses that can be accessed from other IVNs. In at least one embodiment, a scalable fault-tolerant load balancing service of the provider network may be used, so that the number of virtual or physical machines or nodes used for the load balancer can be scaled with the workload, and so that replacement load balancer nodes can be deployed automatically in the event of failures at other load balancer nodes. In one implementation, the load balancer may include one or more compute instances of IVN1.

Optionally, in some embodiments, in response to a discovery request from a potential consumer of Svc1 such as C2, an indication that Svc1 is accessible via a private network pathway or a private address from other IVNs such as IVN2 may be provided (element 910). Such a discovery request may be received programmatically at the control-plane components, e.g., via a marketplace interface or via a different service discovery interface. In some embodiments, a service implementer such as C1 may provide an indication to a potential client of the service directly—e.g., C1 may send a unique identifier of Svc1 to C2, so a separate discovery request may not have to be sent by C2 to the control-plane components managing the namespace of privately-accessible services.

In response to a request from C2 to establish connectivity via a private address between IVN2 and Svc1, one or more additional configuration operations may be performed (element 913) in at least some embodiments. For example, in some cases a new private IP address may be assigned to a load balancer set up for Svc1, such that the new address is accessible from within IVN2. Networking metadata of one or both of the IVNs involved (the service-implementing IVN and/or the service-consuming IVN), such as various routing tables used by virtualization management components and/or internal routers of the provider network may also be modified in some embodiments. In one implementation security settings indicated in the metadata of IVN1 may be modified to permit incoming packets from an address range associated with IVN2, and/or the security settings of IVN2 may be modified to permit incoming packets from an address range associated with IVN1. In some embodiments, the private address or addresses which are to be used for Svc1 requests originating at IVN2 may be provided to C2 after the configuration changes have been implemented.

After the requisite configuration changes are made, packets containing Svc1 service requests from IVN2 may be transmitted to IVN1 using private pathways of the provider network, and similarly service responses may be transmitted from IVN1 to IVN2 using private pathways (element 916). The packets may be transmitted by data-plane components of the provider network in at least some embodiments. Control-plane components of the provider network may monitor the traffic, e.g., at a per-IP-address level, and may provide metrics pertaining to the use of Svc1 to C1 and/or C2 (element 919) in various embodiments. For example, raw or processes/summarized metrics such as the number of service requests fulfilled, the bandwidth consumed, and so on, may be transmitted either periodically or on demand to C1 and/or C2. In some embodiments, the metrics may be indicated in billing statements or billing records.

It is noted that in various embodiments, operations other than those illustrated in the flow diagram of FIG. 9 may be used to implement at least some of the techniques for supporting service request/response traffic across IVN boundaries. Some of the operations shown may not be implemented in some embodiments, may be implemented in a different order or at a different component than illustrated in FIG. 9, or in parallel rather than sequentially. For example, in some embodiments, a load balancer may not be established for a service until a request for private connectivity is received—e.g., the initial set of configuration operations corresponding to element 907 may be performed together with the operations corresponding to element 913.

Use Cases

The techniques described above, of establishing private connectivity across isolated virtual network boundaries so that services implemented at one IVN may be accessed from other IVNs without using public addresses may be useful in a variety of scenarios. As more and more services are migrated to provider network environments, and the sophistication of network-based attackers increases, the need for securing and isolating client services from network intrusions originating in the public Internet is also increasing. If a service implemented at one IVN can only be accessed via an address that is advertised on the public Internet, a service consumer whose service requests originate at a different IVN may be forced to make configuration choices (e.g., setting up a gateway to the public Internet and/or establishing public IP addresses for compute instances that are to use the service) which can potentially increase vulnerability to network attacks. Eliminating a requirement for such configuration choices by supporting private connectivity between the service-implementing IVN and the service-consuming IVN may not only increase the overall security level of a service, but at least in some cases may also lead to improvement in service response latency (e.g., because network pathways managed entirely by the provider network may be used when private addresses are used for the cross-IVN traffic).

Illustrative Computer System

Figure 10:
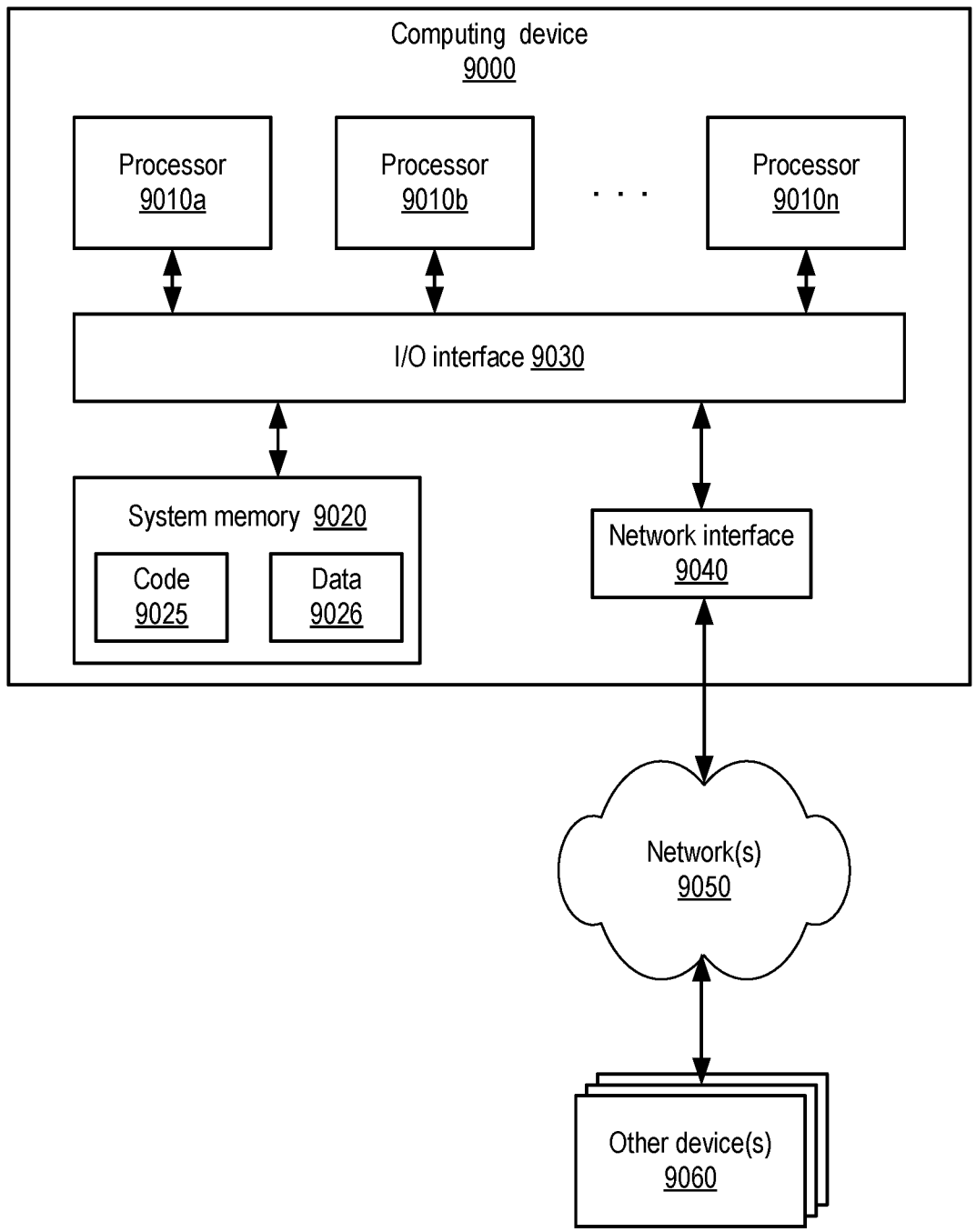
FIG. 10 is a block diagram illustrating an example computing device that may be used in at least some embodiments.

In at least some embodiments, a server that implements one or more of the components that are used to support private addresses or endpoints for services implemented at isolated virtual networks, such as various control-plane components of a provider network, instance hosts and the like, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method for providing private pathways between virtual networks, comprising:
   receiving a request to establish a private endpoint, the request indicating a first virtual network;
   establishing the private endpoint associated with the first virtual network;
   receiving a service request addressed to the private endpoint from a first computing resource in the first virtual network;
   routing the service request to one or more load balancers across network paths not accessible from the public Internet;
   distributing, using the one or more load balancers, the service request to one or more second computing resources in a second virtual network; and
   processing the service request at the one or more second computing resources.

2. The computer-implemented method for providing private pathways between virtual networks as recited in claim 1, wherein the first computing resource is assigned a first Internet Protocol (IP) address within a range of private IP addresses of the first virtual network.

3. The computer-implemented method for providing private pathways between virtual networks as recited in claim 2, wherein the first IP address is not advertised outside the first virtual network.

4. The computer-implemented method for providing private pathways between virtual networks as recited in claim 1, wherein the one or more second computing resources are assigned a second IP address within a range of private IP addresses of the second virtual network.

5. The computer-implemented method for providing private pathways between virtual networks as recited in claim 4, wherein the second IP address is not advertised outside the second virtual network.

6. The computer-implemented method for providing private pathways between virtual networks as recited in claim 1, further comprising:
receiving an identification of one or more approved consumers of one or more computing services, wherein the one or more approved consumers include the first computing resource, wherein the service request is directed to the one or more computing services, and wherein the service request is not accepted unless the service request is from the one or more approved consumers.

7. The computer-implemented method for providing private pathways between virtual networks as recited in claim 6, further comprising:
providing, via one or more programmatic interfaces, one or metrics associated with the use of the one or more computing services.

8. The computer-implemented method for providing private pathways between virtual networks as recited in claim 1, further comprising:
processing, at the one or more second computing resources, a second service request originating at a third computing resource in a third virtual network external to the first virtual network.

9. A system, comprising:
one or more computing devices;
wherein the one or more computing devices include instructions that upon execution on or across the one or more computing devices cause the one or more computing devices to:
receive a request to establish a private endpoint, the request indicating a first virtual network;
establish the private endpoint associated with the first virtual network;
receive a service request addressed to the private endpoint from a first computing resource in the first virtual network;
route the service request to one or more load balancers across network paths not accessible from the public Internet;
distribute, using the one or more load balancers, the service request to one or more second computing resources in a second virtual network; and
process the service request at the one or more second computing resources.

10. The system as recited in claim 9, wherein the first computing resource is assigned a first Internet Protocol (IP) address within a range of private IP addresses of the first virtual network.

11. The system as recited in claim 9, wherein the one or more second computing resources are assigned a second IP address within a range of private IP addresses of the second virtual network.

12. The system as recited in claim 9, wherein the one or more computing devices include further instructions that upon execution on or across the one or more computing devices further cause the one or more computing devices to:
receive an identification of one or more approved consumers of one or more computing services, wherein the one or more approved consumers include the first computing resource, wherein the service request is directed to the one or more computing services, and wherein the service request is not accepted unless the service request is from the one or more approved consumers.

13. The system as recited in claim 12, wherein the one or more computing devices include further additional instructions that upon execution on or across the one or more computing devices further cause the one or more computing devices to:
provide, via one or more programmatic interfaces, one or metrics associated with the use of the one or more computing services.

14. The system as recited in claim 9, wherein the one or more computing devices include further instructions that upon execution on or across the one or more computing devices further cause the one or more computing devices to:
process, at the one or more second computing resources, a second service request originating at a third computing resource in a third virtual network external to the first virtual network.

15. One or more non-transitory computer-accessible storage media storing program instructions that when executed on or across one or more processors cause the one or more processors to:
receive a request to establish a private endpoint, the request indicating a first virtual network;
establish the private endpoint associated with the first virtual network;
receive a service request addressed to the private endpoint from a first computing resource in the first virtual network;
route the service request to one or more load balancers across network paths not accessible from the public Internet;
distribute, using the one or more load balancers, the service request to one or more second computing resources in a second virtual network; and
process the service request at the one or more second computing resources.

16. The one or more non-transitory computer-accessible storage media as recited in claim 15, wherein the first computing resource is assigned a first Internet Protocol (IP) address within a range of private IP addresses of the first virtual network.

17. The one or more non-transitory computer-accessible storage media as recited in claim 15, wherein the one or more second computing resources are assigned a second IP address within a range of private IP addresses of the second virtual network.

18. The one or more non-transitory computer-accessible storage media as recited in claim 15, storing further program instructions that when executed on or across the one or more processors further cause the one or more processors to
receive an identification of one or more approved consumers of one or more computing services, wherein the one or more approved consumers include the first computing resource, wherein the service request is directed to the one or more computing services, and wherein the service request is not accepted unless the service request is from the one or more approved consumers.

19. The one or more non-transitory computer-accessible storage media as recited in claim 18, storing additional program instructions that when executed on or across the one or more processors further cause the one or more processors to:
provide, via one or more programmatic interfaces, one or metrics associated with the use of the one or more computing services.

20. The one or more non-transitory computer-accessible storage media as recited in claim 15, storing further program instructions that when executed on or across the one or more processors further cause the one or more processors to:
process, at the one or more second computing resources, a second service request originating at a third computing resource in a third virtual network external to the first virtual network.

* * * * *